US012441099B2

(12) United States Patent
Efner et al.

(10) Patent No.: US 12,441,099 B2
(45) Date of Patent: Oct. 14, 2025

(54) PRINTING APPARATUS

(71) Applicant: Ball Corporation

(72) Inventors: John D. Efner, Westminster, CO (US); Michael Allen Bombulie, Westminster, CO (US); Charles Cooper, Westminster, CO (US)

(73) Assignee: BALL COPORATION, Westminster, CO (US)

( * ) Notice: Subject to any disclaimer, the term of this patent is extended or adjusted under 35 U.S.C. 154(b) by 56 days.

(21) Appl. No.: 18/547,432

(22) PCT Filed: Feb. 24, 2022

(86) PCT No.: PCT/US2022/017663
§ 371 (c)(1),
(2) Date: Aug. 22, 2023

(87) PCT Pub. No.: WO2022/182848
PCT Pub. Date: Sep. 10, 2022

(65) Prior Publication Data

US 2024/0140084 A1 May 2, 2024

Related U.S. Application Data

(60) Provisional application No. 63/153,116, filed on Feb. 24, 2021.

(51) Int. Cl.
*B41F 17/22* (2006.01)
*B41F 13/004* (2006.01)
(Continued)

(52) U.S. Cl.
CPC .......... *B41F 17/22* (2013.01); *B41F 13/0045* (2013.01); *B41F 13/008* (2013.01);
(Continued)

(58) Field of Classification Search
CPC .... B41F 17/22; B41F 13/0045; B41F 13/008; B41F 13/193; B41F 33/0009; B41P 2213/124; B41P 2213/20
See application file for complete search history.

(56) References Cited

U.S. PATENT DOCUMENTS 3,746,957 A * 7/1973 Forster .................. B41F 31/045
101/248
3,791,294 A * 2/1974 Skelding ................. B41F 13/24
101/352.04

(Continued)

OTHER PUBLICATIONS

International Search Report and Written Opinion for corresponding International Patent Application No. PCT/US2022/017663 dated Jun. 28, 2022; priority document.

*Primary Examiner* — David H Banh
(74) *Attorney, Agent, or Firm* — Greer, Burns & Crain, Ltd.

(57) ABSTRACT

A decorator (10) for printing onto cylindrical structures (18) has a plurality of inkers (12). Each inker (12) has a pair of opposing frame plates (40, 48). A printing plate (204) is affixed to a printing plate cylinder (200) carried by a rotational printing plate cylinder shaft (202). The printing plate shaft (202) is disposed between the opposing frame plates (40, 48). A main shaft (38) supports the inker (12) on the decorator (10) such that the pair of opposing frame plates (40, 48) are slidable along a length of the main shaft (38). A lateral adjustment servomotor (220) acts on a corresponding inker (212) to impart a movement by the inker (12) along the length of the main shaft (38).

20 Claims, 20 Drawing Sheets

(51) Int. Cl.

| | |
|---|---|
| ***B41F 13/008*** | (2006.01) |
| ***B41F 13/193*** | (2006.01) |
| ***B41F 33/00*** | (2006.01) |

(52) U.S. Cl.

CPC ........ *B41F 13/193* (2013.01); *B41F 33/0009* (2013.01); *B41P 2213/124* (2013.01); *B41P 2213/20* (2013.01)

(56) References Cited

U.S. PATENT DOCUMENTS

| | | | | | |
|---|---|---|---|---|---|
| 4,741,266 | A | | 5/1988 | Stirbis et al. | |
| 5,794,531 | A | * | 8/1998 | Keller | B41F 31/304 101/216 |
| 5,970,865 | A | * | 10/1999 | Horth | B41F 17/22 101/490 |
| 2012/0216689 | A1 | * | 8/2012 | Cochran | B41F 17/002 101/39 |
| 2015/0290923 | A1 | * | 10/2015 | Treloar | B41M 1/18 101/217 |
| 2016/0001546 | A1 | * | 1/2016 | Hughes | B41F 17/22 101/38.1 |
| 2018/0009217 | A1 | | 1/2018 | Kilde et al. | |
| 2019/0270298 | A1 | | 9/2019 | Davies | |

* cited by examiner

PRINTING APPARATUS

CROSS-REFERENCE TO RELATED APPLICATIONS

This Application is a United States National Stage Application under 35 U.S.C. Section 371 of International Patent Application No. PCT/US2022/017663 filed on Feb. 24, 2022, which is hereby incorporated by reference as if fully set forth herein. This Application claims priority to and the benefit of U.S. Provisional Patent Application No. 63/153,116, filed on Feb. 24, 2021, the contents of which are hereby incorporated by reference as if fully set forth herein.

FEDERALLY SPONSORED RESEARCH OR DEVELOPMENT

N/A

TECHNICAL FIELD

This invention relates to apparatus for printing onto cylindrical structures and to associated methods of printing onto cylindrical structures.

BACKGROUND

In the field of consumer fluid container manufacture, customers typically require the containers to be decorated with source-identifying indicia, content information, nutritional data, recycling instructions, etc. Specialist printing apparatuses are known to provide continuous, mass printing onto containers at a high throughput. These printing machines are commonly known as "decorators" in the art.

At the present time, there are two main decorator designs which are in common commercial use, although there are additional, smaller volume manufacturers as well. The two main designs are commonly known as the "Concord" and "Rutherford" machines. Although the precise constructional details of the Concord and Rutherford machines differ, in essence they use the same approach to printing onto containers. This approach is a variant of offset printing. More specifically, the decorators comprise a plurality of inkers. Each inker is associated with a different color and has a printing plate affixed to a printing plate cylinder for that color. Each inker is configured to distribute ink of the correct color onto the printing plate. The printing plate has a raised portion corresponding to the desired image for the particular color in question. It will be apparent that, for example, a six inker decorator apparatus can print six colors, and an eight inker decorating apparatus can print eight colors.

The ink from the printing plate of each inker is transferred onto the surface of one of a number of transfer blankets. The intention is that the transfer blanket and the printing plate cylinders of all of the inkers are mutually positioned and oriented such that the different colored inks are in proper registration when applied on a transfer blanket and subsequently to a container. When proper registration is achieved, the pattern of multiple colored inks on the transfer blanket corresponds to the desired final decoration.

The decorator apparatus comprises a plurality of transfer blankets which are disposed on a rotating blanket wheel. As the wheel rotates, a transfer blanket which has had all of the inks transferred to it in the desired pattern is brought into contact with a container carried by a suitable conveyor system which typically uses a number of mandrels on a mandrel carrier. The decorator apparatus is configured so that each container is brought into contact with a transfer blanket so that the full multicolored indicia is transferred to the surface of the container.

During a continuous container printing process, some misregistration of one or more of the colors typically occurs. Misregistration is when designs are not properly positioned on the decorated container. Traditionally, registration errors have been corrected manually.

More specifically, misregistration is detected by manual inspection or non-manual inspection of the printed containers. If a misregistration is identified, it has been necessary to shut down printing for a period of time while manual adjustments of the inkers are made. This is an inefficient process for at least two reasons. First, there is a time lag before a misregistration is identified which can result in a large number of defective containers. Secondly, it is inefficient and undesirable to shut down a continuous process for any period of time.

The present invention is provided to solve the problems discussed above and other problems, and to provide advantages and aspects not provided by prior systems of this type. Additionally, the present invention provides improved arrangements for controlling the position of the printing plate cylinders. A full discussion of the features and advantages of the present invention is deferred to the following detailed description, which proceeds with reference to the accompanying drawings.

SUMMARY

According to the present disclosure, a decorator for printing onto cylindrical structures comprises:

- a plurality of inkers, each inker comprising:
  - a pair of opposing frame plates;
  - a printing plate affixed to a printing plate cylinder carried by a rotational printing plate cylinder shaft disposed between the opposing frame plates;
  - a main shaft supporting the inker on the decorator wherein the pair of opposing frame plates are slidable along a length of the main shaft;
  - a plurality of lateral adjustment servomotors, each lateral adjustment servomotor acting on a corresponding inker to impart a movement by the inker in a direction parallel to the length of the main shaft.

This aspect of the present disclosure may include one or more of the following features, alone or in any reasonable combination. Each printing plate may comprise a portion in high relief, wherein the high relief portion receives a colored fluid from a supply of colored fluid. The decorator may further comprise a blanket wheel rotationally mounted on the decorator and a plurality of transfer blankets attached to the blanket wheel and rotational therewith, wherein each transfer blanket engages each of the printing plates to receive quantity of the colored fluid therefrom, wherein a location of the colored fluid across a surface of each transfer blanket is regulated by a lateral adjustment servomotor in the plurality of lateral adjustment servomotors. Each inker may further comprise a plurality of rolls disposed between the opposing frame plates, each roll carried by a corresponding rotational shaft, and a drive train comprising a plurality of gears, each gear attached to a rotational shaft, wherein the drive train is movable along the length of the main shaft in response to a force provided by a lateral adjustment servomotor in the plurality of lateral adjustment servomotors. Each inker may further comprise an angular adjustment servomotor in operable communication with the printing plate cylinder shaft to impart rotation thereto, wherein the angular adjustment servomotor is configured to adjust a registration of the printing plate in relation to the plurality of transfer blankets. Each lateral adjustment servomotor may be configured to selectively alter a position of a graphic on a decorated cylindrical container in a directions along a center axis about which the container is centered from a top to a bottom of the container. Each angular adjustment servomotor may be configured to selectively alter a position of a graphic on a decorated cylindrical container in a direction about a circumference of the container is centered from right to left or from left to right. Each inker may further comprise an encoder for outputting rotational speed and angular position data of the angular adjustment servomotor. The decorator may further comprise a container component conveyor for transporting the container components into and out of contact with the transfer blankets. The container component conveyor may comprise a mandrel carrier for holding can bodies thereon. Each inker comprises a pair of lateral adjustment servomotors, wherein one of the pair of lateral adjustment servomotors acts on one of the opposing frame plates and the other of the lateral adjustment servomotors acts the other of the opposing frame plates to displace the printing plate cylinder back and forth in a direction parallel with an axis of rotation of the main shaft.

The disclosure is also directed to a container component decorating system comprising:

a decorator as described in any preceding paragraph; and a controller configured to adjust a registration between each printing plate and the transfer blankets.

This aspect of the disclosure may include one or more of the following features, alone or in any reasonable combination. The controller may comprise an interface configured to allow a user to adjust an angular position and a lateral position of each print plate cylinder on each inker. The controller may comprise a programmable motion controller for regulating a plurality of servomotors and a rotation of the printing plate cylinder shaft. The programmable motion controller may be configured to allow a user to adjust an angular position and a lateral position of each print plate cylinder on each inker. The controller may comprise an amplifier configured to allow a user to adjust a speed of rotation and a positioned of each print plate cylinder.

The disclosure is also directed to an improvement to a decorator for continuously printing graphic designs on individually fed container bodies. The decorator comprises a conveyor including a mandrel carrier which delivers container bodies in a queue to a print site where each container body engages a single transfer blanket in the a plurality of transfer blankets attached to a rotating blanket wheel, each transfer blanket receiving a pattern of ink from one or more inkers supported on the decorator by a main shaft and disposed about a circumference of the transfer blanket via engagement with a printing plate which is disposed between a pair of opposing frame plates on the inker, wherein rotation of the blanket wheel imparts rotation to the printing plate by rotation of a printing plate cylinder shaft. The improvement comprises one or more lateral adjustment servomotors in operable communication with one or more of the inkers such that the one or more inkers slides along the main shaft in a direction parallel to an axis of rotation of the printing plate cylinder shaft in response to activation of the lateral adjustment servomotor.

This aspect of the disclosure may include one or more of the following features, alone or in any reasonable combination. The one or more lateral adjustment servomotors may be configured to adjust an alignment of the printing plate and the transfer blanket by activating the one or more lateral adjustment servomotors. The one or more lateral adjustment servomotors may operably engage a first plate in the pair of the opposing frame plates. The one or more lateral adjustment servomotors may operably engage a second plate in the pair of opposing frame plates. A drive train of the one of more inkers may be disengaged from the rotation of the blanket wheel, wherein rotation of the printing plate cylinder shaft is independent of rotation of the blanket wheel; and an angular adjustment servomotor may be operably attached to the printing plate cylinder shaft to provide rotation thereto. The angular adjustment servomotor may be configured to adjust an angular alignment of the printing plate and the transfer blanket by activating the angular adjustment servomotor. A human machine interface may be configured to allow a user to adjust the alignment between the printing plate and the transfer wheel.

Another aspect of the disclosure is directed to a decorator for printing onto cylindrical structures comprising:

a rotational blanket wheel carrying a transfer blanket;

a bull gear rotational with the blanket wheel;

a plurality of inkers, each inker comprising:

- a pair of opposing frame plates;
- a printing plate affixed to a printing plate cylinder;
- a plurality of inker rolls positively driven a corresponding plurality of inker gears forming a drive train;
- a two-piece shaft comprising a first shaft and a second shaft, the first shaft in operable communication with the drive train and having a central passage passing therethrough and the second rotational within the passage independently of rotation by the first shaft;
- a first gear operably joined to the first shaft and in engagement with the bull gear; and
- a second gear operably joined to the first shaft and the drive train, wherein rotational motion by the bull gear transfers rotation to the first gear which transfers rotational motion to the second gear, which transfers rotational motion to the plurality of inker gears forming the drive train, a plurality of angular adjustment servomotors, each angular adjustment servomotor associated with an inker in the plurality of inkers and operably joined to the second shaft within the first shaft and imparting rotational motion thereto.

This aspect of the disclosure may include one or more of the following features, alone or in any reasonable combination. The decorator may further comprise a sensor measuring a rotational speed of a decorator component. The decorator may further comprise a controller, wherein the controller receives a signal from the sensor corresponding to the rotational speed, and wherein the controller signals at least one of the plurality of angular adjustment servomotors to impart rotational motion at a speed equal to a speed of rotation of the first shaft to the second shaft to which the at least one of the plurality of angular adjustment servomotors is operably joined. The at least one of the plurality of angular adjustment servomotors may incrementally rotate the second shaft to which the at least one of the plurality of angular adjustment servomotors is operably joined to adjust a rotational position of a printing plate attached to the second shaft in relation to the transfer blanket. One or more increments provided by the at least one of plurality of angular adjustment servomotors to the second shaft to which the at least one of the plurality of angular adjustment servomotors may be operably joined is determined based on an inspection of one of a decorated container and the transfer blanket. The decorator may further comprise a plurality of lateral adjustment servomotors, each of the plurality of lateral adjustment servomotors associated with an inker of the plurality inkers, wherein each of the plurality of lateral adjustment servomotors is operably joined to the second shaft of the associated inker and imparts a lateral adjustment to the second shaft in a direction parallel to a center axis of the two-piece shaft of the associated inker to adjust a position of the printing plate of the associated inker in relation to the transfer blanket. A magnitude of the linear motion may be determined by an inspection of at least one of the beverage container and the transfer blanket. Each printing plate may comprise a portion in high relief, wherein the high relief portion receives a colored fluid from a supply of colored fluid. The transfer blanket may engage each printing plate to receive quantity of the colored fluid therefrom, wherein a location of the colored fluid across a surface of the transfer blanket is regulated by a servomotor in the plurality of angular adjustment servomotors. Each angular adjustment servomotor may be configured to selectively alter a position of a graphic on a decorated cylindrical container in a direction about a circumference of the container from right to left or from left to right (i.e., adjusting the graphic placement circumferentially about a circumferential side wall of the container body). Each inker may further comprise an encoder for outputting rotational speed of the bull gear. The decorator may further comprise a container component conveyor for transporting the container components into and out of contact with the transfer blanket. The container component conveyor may comprise a mandrel carrier for holding can bodies thereon.

Another aspect of the disclosure is directed to a decorator for printing onto cylindrical structures comprising:

- a rotational blanket wheel carrying a transfer blanket;
- a bull gear rotational with the blanket wheel;
- a plurality of inkers, each inker comprising:
  - a pair of opposing frame plates;
  - a printing plate affixed to a printing plate cylinder;
  - a plurality of inker rolls positively driven a corresponding plurality of inker gears forming a drive train;
  - a two-piece shaft comprising a first shaft and a second shaft, the first shaft in operable communication with the drive train and having a central passage passing therethrough and the second rotational within the passage independently of rotation by the first shaft;
  - a first gear operably joined to the first shaft and in engagement with the bull gear;
  - a second gear operably joined to the first shaft and the drive train,
  - wherein rotational motion by the bull gear transfers rotation to the first gear which transfers rotational motion to the second gear, which transfers rotational motion to the plurality of inker gears forming the drive train, and
- a plurality of lateral adjustment servomotors, each of the plurality lateral adjustment servomotors associated with an inker of the plurality inkers and operably joined to the second shaft to impart a lateral adjustment to the second shaft in a direction parallel to a center axis of the two-piece shaft of the inker to adjust a position of the printing plate of the associated inker in relation to the transfer blanket.

This aspect of the disclosure may include one or more of the following features, alone or in any reasonable combination. The decorator may further comprise a sensor measuring a rotational speed of a decorator component. The decorator may further comprise a controller, wherein the controller receives a signal from the sensor corresponding to the rotational speed, and wherein the controller signals at least one of a plurality of angular adjustment servomotors to impart rotational motion at a speed equal to a speed of rotation of the first shaft to the second shaft to which the at least one of the plurality of angular adjustment servomotors is operably joined. The at least one of the plurality of first servomotors may incrementally rotate the second shaft to which the at least one of the plurality of angular adjustment servomotors is operably joined to adjust a rotational position of a printing plate attached to the second shaft in relation to the transfer blanket. One or more increments provided by the at least one of plurality of angular adjustment servomotors to the second shaft to which the at least one of the plurality of angular adjustment servomotors may be operably joined is determined based on an inspection of one of a decorated container and the transfer blanket. Each printing plate may comprise a portion in high relief, wherein the high relief portion receives a colored fluid from a supply of colored fluid. The transfer blanket may engage each printing plate to receive quantity of the colored fluid therefrom, wherein a location of the colored fluid across a surface of the transfer blanket is regulated by a servomotor in the plurality of lateral adjustment servomotors. Each inker may further comprise a plurality of rolls disposed between the opposing frame plates, each roll carried by a corresponding rotational shaft and a drive train comprising a plurality of gears, each gear attached to a rotational shaft, wherein the drive train is movable along the length of the main shaft in response to a force provided by a servomotor in the plurality of lateral adjustment servomotors. Each inker further comprises an angular adjustment servomotor in operable communication with the printing plate cylinder shaft to impart rotation thereto, wherein the angular adjustment servomotor is configured to adjust a registration of the printing plate in relation to the transfer blanket. Each angular adjustment servomotor may be configured to selectively alter a position of a graphic on a decorated cylindrical container in a direction about a circumference of the container is centered from right to left or from left to right. The decorator may further comprise a container component conveyor for transporting the container components into and out of contact with the transfer blankets. The container component conveyor may comprise a mandrel carrier for holding can bodies thereon.

Another aspect of the disclosure is directed to a decorator for printing onto cylindrical structures comprising:

- a rotational blanket wheel carrying a transfer blanket;
- a bull gear rotational with the blanket wheel;
- a plurality of inkers, each inker comprising:
  - a pair of opposing frame plates;
  - a printing plate affixed to a printing plate cylinder;
  - a plurality of inker rolls positively driven a corresponding plurality of inker gears forming a drive train;
  - a two-piece shaft comprising a first shaft and a second shaft, the first shaft in operable communication with the drive train and having a central passage passing therethrough and the second rotational within the passage independently of rotation by the first shaft;
  - a first gear operably joined to the first shaft and in engagement with the bull gear; and
  - a second gear operably joined to the first shaft and the drive train,
  - wherein rotational motion by the bull gear transfers rotation to the first gear which transfers rotational motion to the second gear, which transfers rotational motion to the plurality of inker gears forming the drive train,
- a plurality of angular adjustment servomotors, each angular adjustment servomotor associated with an inker in the plurality of inkers and operably joined to the second shaft within the first shaft and imparting rotational motion thereto; and a plurality of lateral adjustment servomotors, each of the plurality lateral adjustment servomotors associated with an inker of the plurality inkers and operably joined to the second shaft to impart a lateral adjustment to the second shaft in a direction parallel to a center axis of the two-piece shaft of the inker to adjust a position of the printing plate of the associated inker in relation to the transfer blanket.

The disclosure is also directed to a container component decorating system comprising:

a decorator as described in any preceding paragraph; and a controller configured to adjust a registration between each printing plate and the transfer blankets.

This aspect of the disclosure may include one or more of the following features, alone or in any reasonable combination. The controller may comprise an interface configured to allow a user to adjust an angular position and a lateral position of each print plate cylinder on each inker. The controller may comprise a programmable motion controller for regulating a plurality of angular adjustment servomotors and a rotation of the printing plate cylinder shaft. The programmable motion controller may be configured to allow a user to adjust an angular position and a lateral position of each print plate cylinder on each inker. The controller may comprise an amplifier configured to allow a user to adjust a speed of rotation and a positioned of each print plate cylinder.

The disclosure is also directed to an improvement to a decorator for continuously printing graphic designs on individually fed container bodies. The decorator comprises a conveyor including a mandrel carrier which delivers container bodies in a queue to a print site where each container body engages a single transfer blanket in the a plurality of transfer blankets attached to a rotating blanket wheel, each transfer blanket receiving a pattern of ink from one or more inkers supported on the decorator by a main shaft and disposed about a circumference of the transfer blanket via engagement with a printing plate which is disposed between a pair of opposing frame plates on the inker, wherein rotation of the blanket wheel imparts rotation to the printing plate by rotation of a printing plate cylinder shaft. The improvement comprises one or more lateral adjustment servomotors in operable communication with one or more of the inkers such that the one or more inkers slides along the main shaft in a direction parallel to an axis of rotation of the printing plate cylinder shaft in response to activation of the lateral adjustment servomotor.

This aspect of the disclosure may include one or more of the following features, alone or in any reasonable combination. The one or more lateral adjustment servomotors may be configured to adjust an alignment of the printing plate and the transfer blanket by activating the one or more lateral adjustment servomotors. The one or more lateral adjustment servomotors may operably engage a first plate in the pair of the opposing frame plates. The one or more lateral adjustment servomotors may operably engage a second plate in the pair of opposing frame plates. A drive train of the one of more inkers may be disengaged from the rotation of the blanket wheel, wherein rotation of the printing plate cylinder shaft is independent of rotation of the blanket wheel; and an angular adjustment servomotor may be operably attached to the printing plate cylinder shaft to provide rotation thereto. The angular adjustment servomotor may be configured to adjust an angular alignment of the printing plate and the transfer blanket by activating the angular adjustment servomotor. A human machine interface may be configured to allow a user to adjust the alignment between the printing plate and the transfer wheel.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
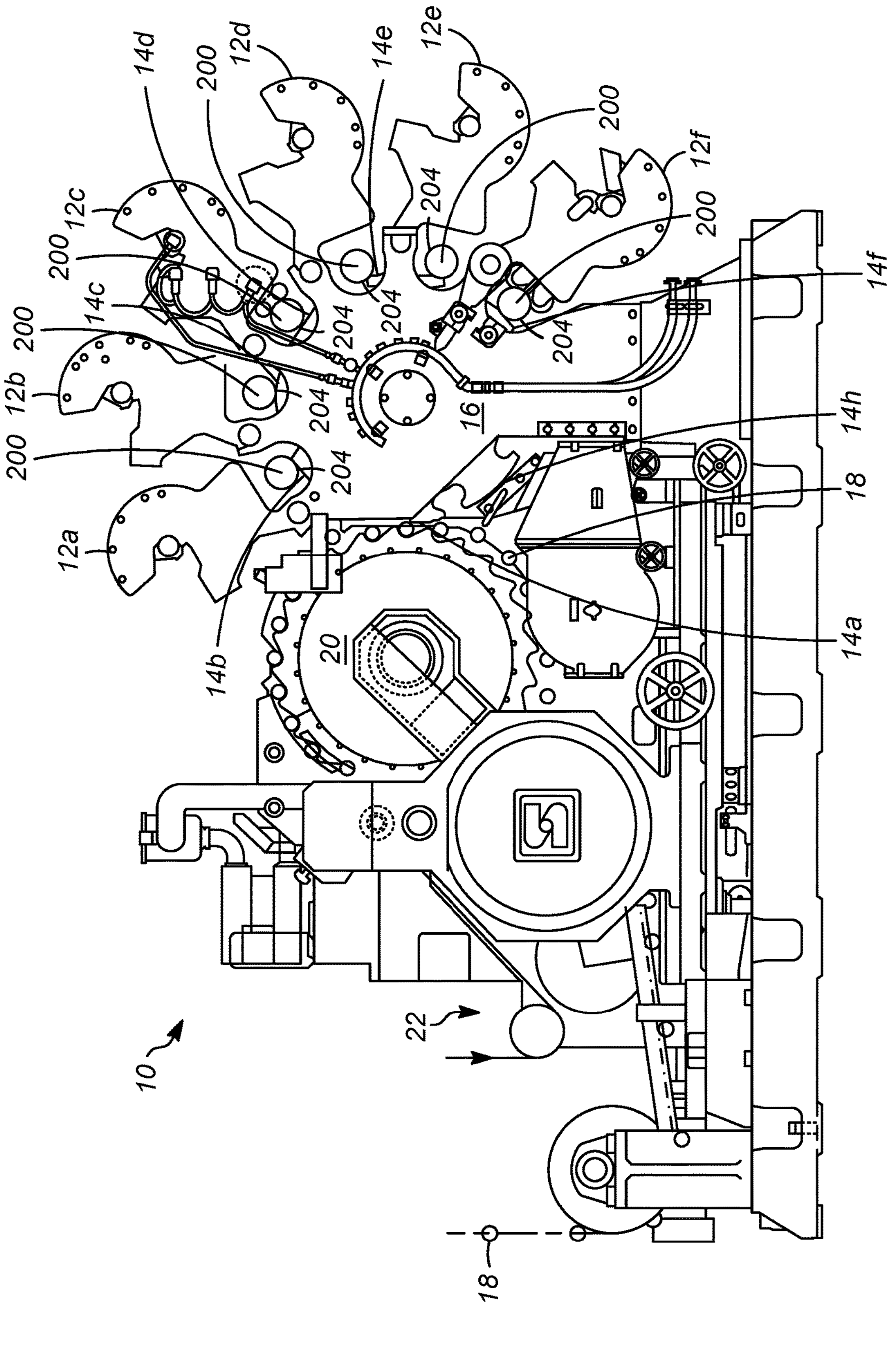
FIG. 1 is a view of a decorator of the disclosure.

One embodiment of the present disclosure is directed to a retrofit of a container decorator, for example a Rutherford decorator inker. The retrofit comprises a servomotor drive. The servomotor drive is configured to allow independent control over an inker motion of the decorator. This is achieved by a servomotor separating the inker motion from an existing drive system of the decorator.

The existing drive system of the decorator includes a helical bull gear which drives a matching helical gear on each individual inker. By disconnecting the inker from the bull gear. A printing plate cylinder will become free spinning. This will allow a servomotor to be connected to the inker's gearbox and be driven independently. A servomotor will be synchronized with the decorator drive to ensure the servomotor is rotating the inker at the exact speed needed. The servomotor drive will be retrofitted with an encoder for positioning purposes. This will allow the servo to change its position of the printing plate cylinder while running to adjust for circumferential register positioning for that printing plate.

There are two registration adjustments on a prior Rutherford decorator, lateral and circumferential. These adjustments require the decorator to stop in order to make changes to the printing plate cylinder. By having a servomotor drive the inker, the position of the printing plate cylinder can be controlled independently from the rest of the decorator. This will allow an operator, through a human-machine interface (HMI) controller, to change a position of the servomotor thus changing the position of the printing plate cylinder rotational position. By having control of the rotational position of the printing plate cylinder, an operator can change the circumferential register of a printing plate while the decorator is operational and decorating containers.

Commercial decorators, such as a Rutherford decorator, require the apparatus to be stopped to make register adjustments. There are two possible register moves, lateral and circumferential. A servomotor driven inker will allow the adjustment of circumferential register without stopping the decorator, essentially minimizing graphic label change time by limiting the need to stop the decorator to make adjustment by half.

Thus, this disclosure describes corrections to a placement or location of a graphic on a container body, generally a cylindrical container body. Two types of corrections are described.

One type of correction is to the placement about the circumference of the container body. This type of correction may be referred to as left to right, angular, or circumferential corrections. This type of correction is generally accomplished by making small incremental adjustments to the position of a printing plate by rotating the printing plate, either clockwise or counterclockwise, relative to a transfer blanket on which the printing plate deposits ink in a desired graphic or shape. Thus, when viewing the decorated container body in normal upright use, these corrections would adjust the graphic an angle $\varphi$ from a polar axis a cylindrical coordinate system.

The other type of correction is to the placement from one end of the container body to another end of the container body. This type of correction may be referred to as up and down, lateral, or linear corrections. This type of correction is generally accomplished by making small incremental adjustments to the position of a printing plate by moving the printing plate in a direction parallel to an axis of rotation of the printing plate cylinder shaft, relative to a transfer blanket on which the printing plate deposits ink in a desired graphic or shape. Thus, when viewing the decorated container body in normal upright use, these corrections would adjust the graphic upwardly or downwardly along an L-axis in a cylindrical coordinate system.

Generally, a decorator prints images on a metallic container, for example an aluminum beverage can. Within the decorator, there are 6 to 8 inkers which apply individual ink colors required for a finished graphic design. An inker transfers metered ink from an ink fountain through a series of rollers to apply a layer of ink on a raised image of a printing plate which is carried on a rotational printing plate cylinder. This method of printing is called flexography.

An additional step is performed by transferring an image representing a partial portion of the finished graphic design from a first printing plate to a transfer blanket, typically a rubber sheet member. This is repeated for as many printing plates, as necessary. For example, each printing plate of the 6 to 8 (or more, or fewer) printing plates transfers its respective pattern of ink to a single transfer blanket. In other words, each transfer blanket can receive ink from multiple printing plates.

After each transfer blanket receives ink from one or more printing plates. A single transfer blanket engages a single container to transfer a complete finished graphic design on the container. This extra step is referred to as "offset" and allows all the colored images from all the inkers to be applied to a single transfer blanket and then transferred to a single container.

The transfer blanket sheets are attached to a blanket wheel which is segmented to allow up to 12 transfer blankets to be attached thereto. As the blanket wheel rotates each transfer blanket collects the images from each printing plate and transfers all the images at once onto a container.

Each inker is fixed to the decorator housing and its rotation is controlled by one central motor which drives all the inkers and the blanket wheel at the same speed, this ensures a transfer blanket will receive an image from each printing plate at the correct time ensuring the image is lined up, i.e. in register.

Attached to the blanket wheel is a bull gear. This is a wheel with a helical gear attached to the outside diameter. When an inker is installed, the teeth of this bull gear line up with a helical gear attached internally in the inker. Each inker uses the same process of installation. Thus, when the bull gear is rotated each inker is rotated at the same rate causing the entire system to stay in time.

An inker has a series of rollers used to evenly distribute ink from an ink fountain to a printing plate carried on a printing plate cylinder. A printing plate cylinder shaft is rotated by a gear fixed to the shaft. This gear is matched to the bull gear. The printing plate cylinder shaft has a second gear attached to it. This second gear is used to drive all the rollers in the inker which also have a gear attached to them.

With the whole system in place, a motor drives the blanket wheel along with the bull gear. The bull gear drives each inker's printing plate cylinder shaft which in turn drives the roller train within each inker.

The printing plate cylinder shaft secures a printing plate cylinder. The printing plate cylinder is a component which holds the printing plate. The printing plate cylinder is magnetized, so a metal-backed printing plate is held in place. There are pins on the printing plate cylinder used to line up the printing plate which have punch holes matching the pins.

Misregistration often begins or originates during the installation of a printing plate on a printing plate cylinder and/or the printing plate cylinder on the printing plate cylinder shaft. A great area of concern is the printing plate mounted on the printing plate cylinder. With age, the printing plate cylinder pins can become worn causing the printing plate to be in a slightly different position with every install. Additionally, when the printing plate is made, there is always a chance of the machine not lining up the printing plate exactly perfect every time.

With these variables affecting each printing plate of each inker, there is a high probability that all or some of the final graphic design image will be out of register slightly on the container. There are adjustments in place to allow for manipulating the printing plate on each inker. On a Rutherford decorator, the process of making these adjustments requires the decorator to be stopped as the actual printing plate cylinder will need to be adjusted. Stopping a decorator is problematic during a printing plate adjustment as it is time-loss in production.

Again, there are two types of register issues which can be corrected by adjusting the printing plate cylinder, lateral and circumferential. Lateral register adjusts the image top to bottom of the container. Circumferential register alters the image position around or about a circumference of the container (which can also be considered as left to right or side-to-side).

Principles of the present disclosure enable circumferential register control remotely by individually driving the inker. This is accomplished by disconnecting the gear on the printing plate cylinder shaft from the bull gear allowing the printing plate shaft to be free spinning, then retrofitting a servomotor in operable engagement with the printing plate cylinder shaft. By using the existing gear train within the inker used to simultaneously drive all the rollers, a mounted servomotor drives that same roller train and the printing plate cylinder shaft. A servomotor with an accompanying encoder rotates the entire roller train.

The encoder ensures the servomotor is maintained at a same speed, or approximately the same speed, as the rest of the decorator by matching the speed with the decorator electronics. The encoder is electrically connected to the servomotor also allows the servomotor to change its position slightly while it is rotating by redefining the encoder position. This ability allows the inker's roller train to be repositioned rotationally. Since the printing plate cylinder shaft is part of the roller gear train, repositioning the roller gear train ultimately repositions printing plate cylinder and the image being transferred to the transfer blanket. This changes circumferential register. By having the ability to alter the circumferential register while the decorator is printing containers, downtime incurred during a graphic design change to correct register is reduced by 50%, while downtime to solely correct registration errors can be reduced by as much as 90% or more.

An existing inker must be modified to hold and support the servomotor, this requires one or more guards altered to fit a motor assembly. A software routine matches the resultant speed of the inker from the servomotor speed to the decorator speed. An HMI is incorporated in order to make changes to the servomotor to alter, change, or control register.

Generally, one aspect of the disclosure requires disconnecting a gear on the printing plate cylinder shaft from the bull gear which allows the printing plate cylinder to be free spinning, then retrofit a servomotor on the inker. By using the existing gear train within the inker used to simultaneously drive all the rollers, a mounted servomotor drives that same roller train and the printing plate cylinder shaft. A servomotor with an accompanying encoder drives the entire inker to cause rotation of the rollers, gears, and shafts of the inker. The encoder is a sensor that notifies a controller of a speed and a position of the servomotor. These encoders (position detectors) can be structurally classified as "incremental encoders" and "absolute encoders". An absolute encoder outputs the absolute position of a rotation angle. An incremental encoder outputs a pulse with respect to a change portion of a rotation angle.

The encoder ensures the servomotor maintained the same speed as the rest of the decorator by matching the speed with the decorator electronics. The encoder on the servomotor would also allow the servomotor to change its position slightly while rotating by redefining the encoder position. Stated another way, the servomotor changes the position of the printing plate relative to the transfer blankets and blanket wheel. The encoder measures that change. This ability would allow the inker's roller train to be repositioned rotationally. Since the printing plate cylinder shaft is part of the ink roller gear train, repositioning the roller gear train would ultimately reposition printing plate cylinder and the image being transferred to the blanket, this changes circumferential register. A human machine interface ("HMI") will be incorporated in order to make changes to the servomotor which will change register.

By modifying the main shaft on the inker, when the inker is mounting into the decorator it will have the ability to slide side-to-side while maintaining radial rigidity. The decorator has machined saddles the main shaft fits into, this main shaft is configured to allow the main shaft to move even when strapped in place. The straps ensure the inker will not move up or down but are configured to allow the main shaft to move axially. This axial motion will permit lateral registration.

Referring to FIG. 1, a standard container decorator 10 is illustrated. This decorator 10 has one or more inkers 12*a*-12*f* (collectively referred to hereinafter as "12"). In the example illustrated, there are six (6) inkers which can supply six (6) different colored inks if desired. More or fewer inkers 12 can be employed on the decorator as a particular finished graphic design requires.

One or more, transfer blankets 14*a*-14*h* (collectively referred to hereinafter as "14", and the transfer blanket which would be labeled "14*g*" is otherwise obscured by decorator elements) are disposed on a blanket wheel 16. A rotation by the blanket wheel 16 brings the transfer blankets 14 into contact with the inkers 12 to transfer ink onto the transfer blankets 14. The rotation by the blanket wheel 16 also brings each transfer blanket 14*a-h* into contact with a container body 18 to transfer the ink onto a surface of the container body 18.

The container bodies 18 on a mandrel carrier 20 are transported into and out of contact with the transfer blankets 14 by a conveyor system 22.

In the embodiment shown in FIG. 1, there are six inkers 12*a*-12*f* which enables up to six different color inks to be used to form the complete indicia which is printed onto each container 18. Also, according to the embodiment shown in FIG. 1, the decorator 10 comprises eight transfer blankets 14*a*-14*h*. However, the invention is not limited in this regard, and in principle any suitable numbers of inkers and transfer blankets might be utilized.

The design and operation of the transfer blankets 14*a*-14*h*, blanket wheel 16, and conveyor system 22 with the mandrel carrier 20 are essentially conventional in nature. One of ordinary skill in the art is readily familiar with the general design and operation of same. Therefore, it is not necessary to provide a further, more detailed discussion of these portions of the decorator apparatus 10.

Each inker 12 comprises a printing plate cylinder 200 which is rotated by a printing plate cylinder shaft 202. These aspects of the inkers are described in more detail below. Other features of the inkers 12, such as the arrangement for applying ink to the printing plate cylinders 200, are essentially conventional in nature. Therefore, a more detailed discussion of these portions of the inkers 12 is not necessary. The decorator 10 or a decorating system comprises the decorator 10 and a controller device 24.

Figure 6:
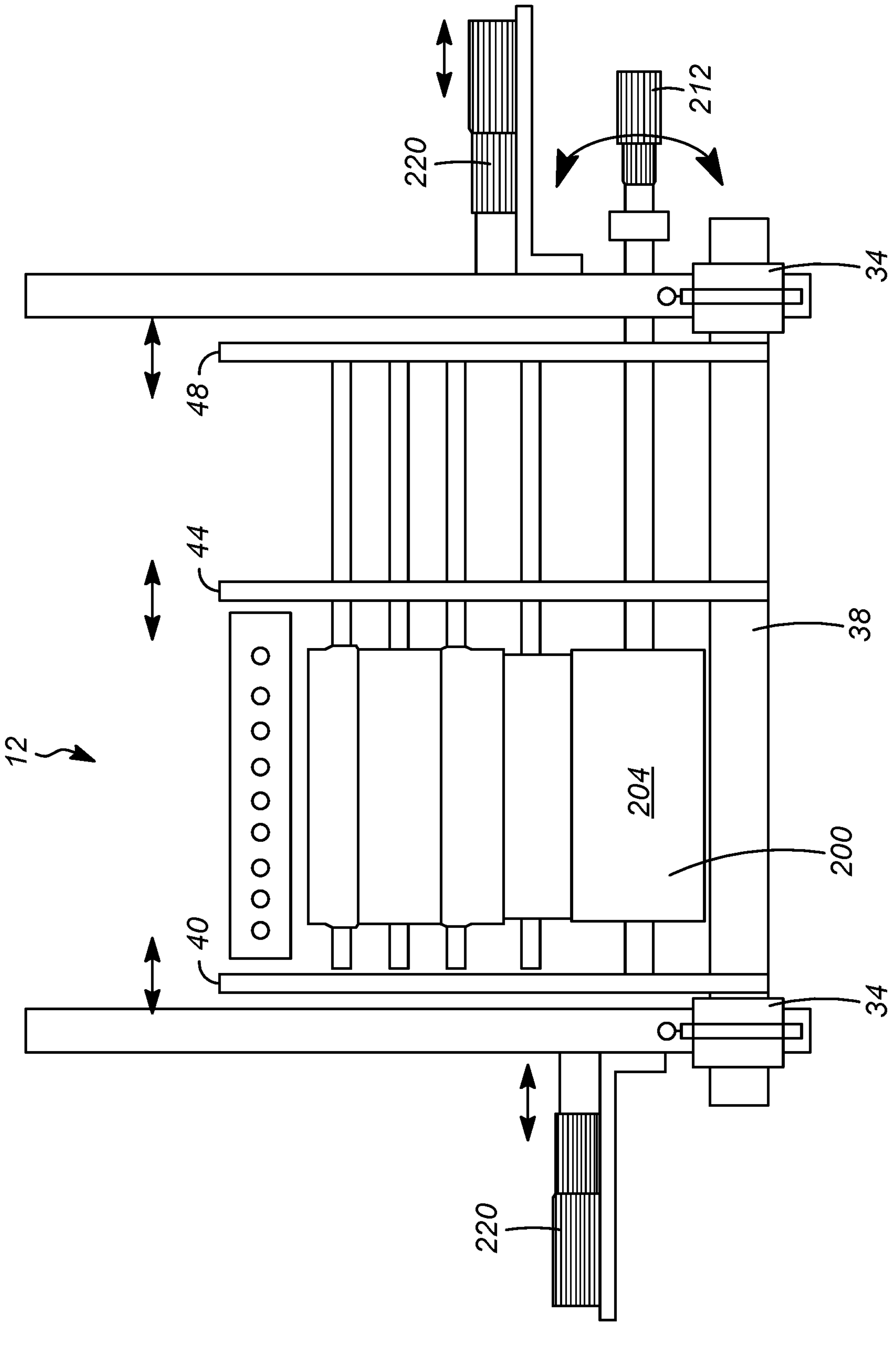
FIG. 6 is a schematic-type view of an inker of the present disclosure.
Figure 7:
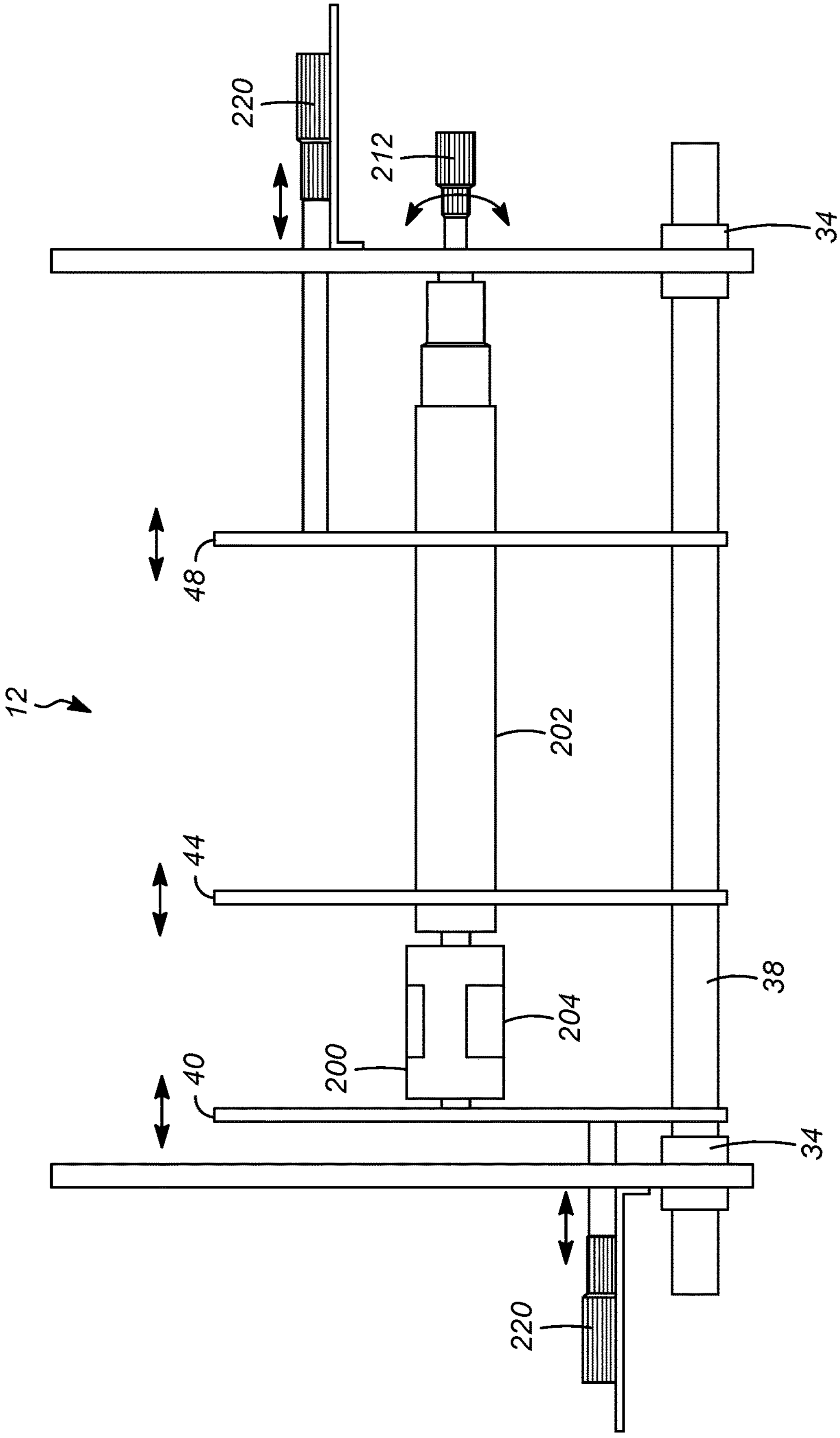
FIG. 7 is a partial schematic-type view of an inker of the present disclosure.
Figure 8:
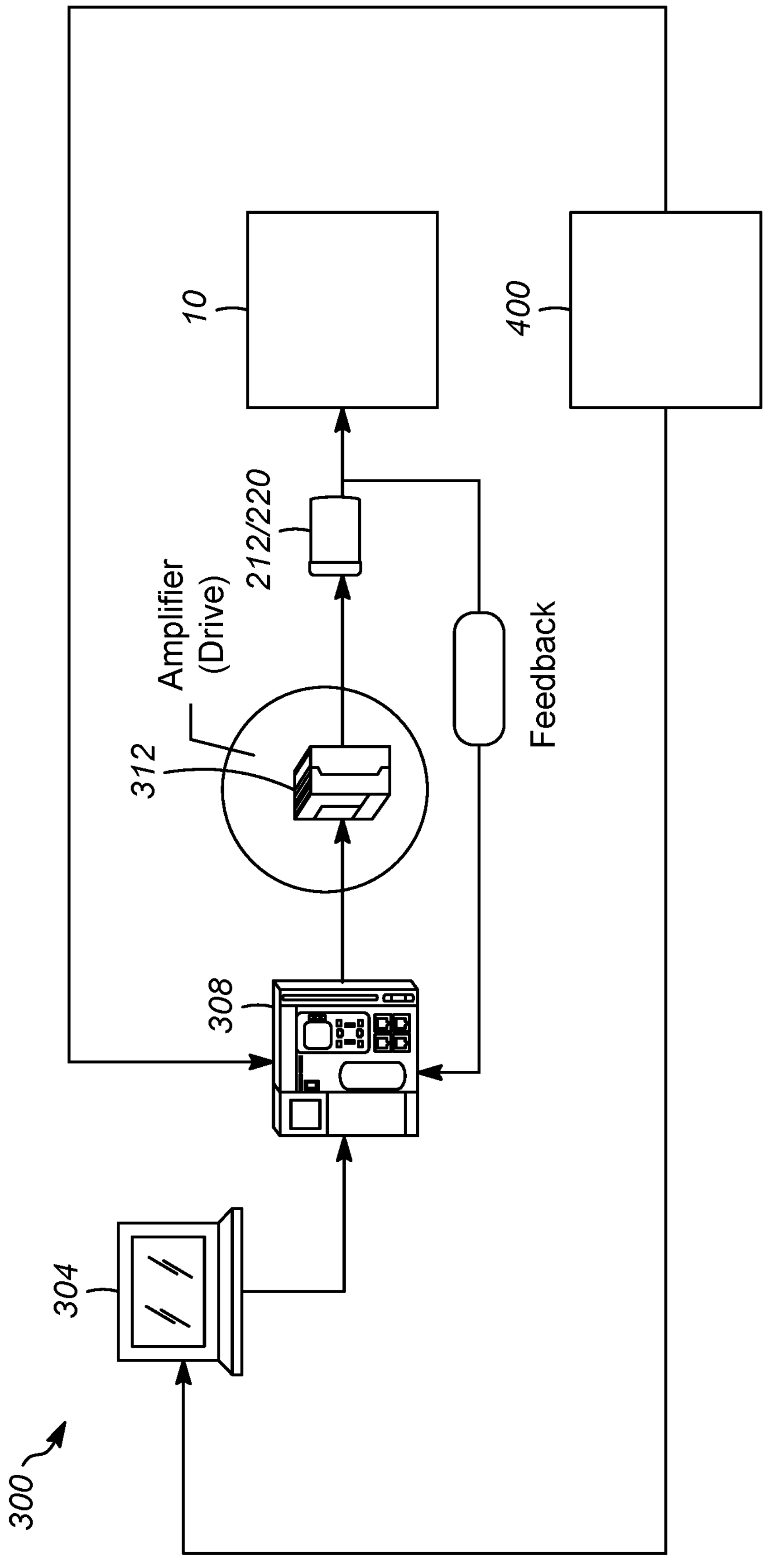
FIG. 8 is a schematic-type view of a system of the present disclosure.
Figure 9:
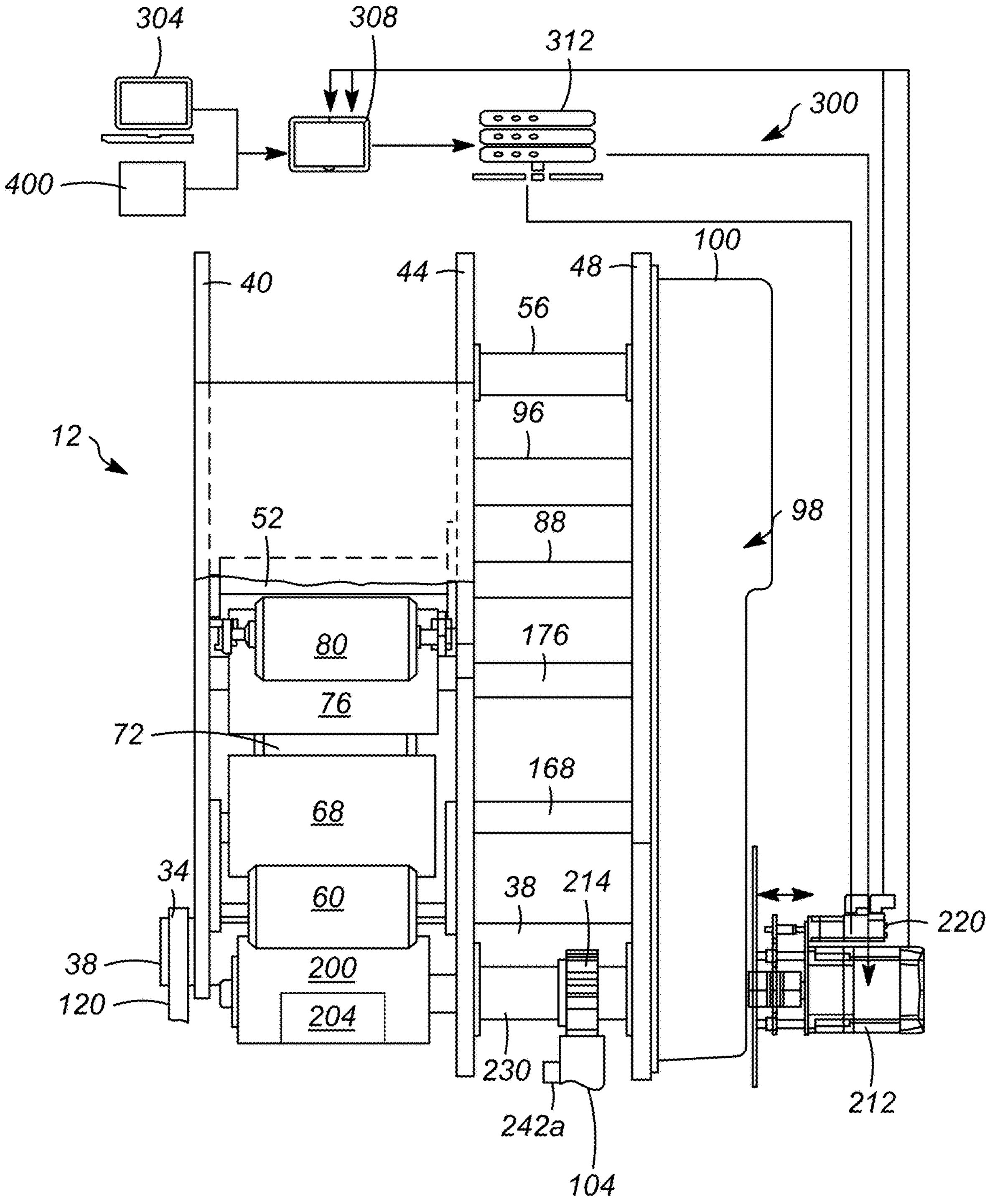
FIG. 9 is a view of an embodiment of an inker of the present disclosure from the A-A perspective illustrated in FIG. 2.
Figure 10:
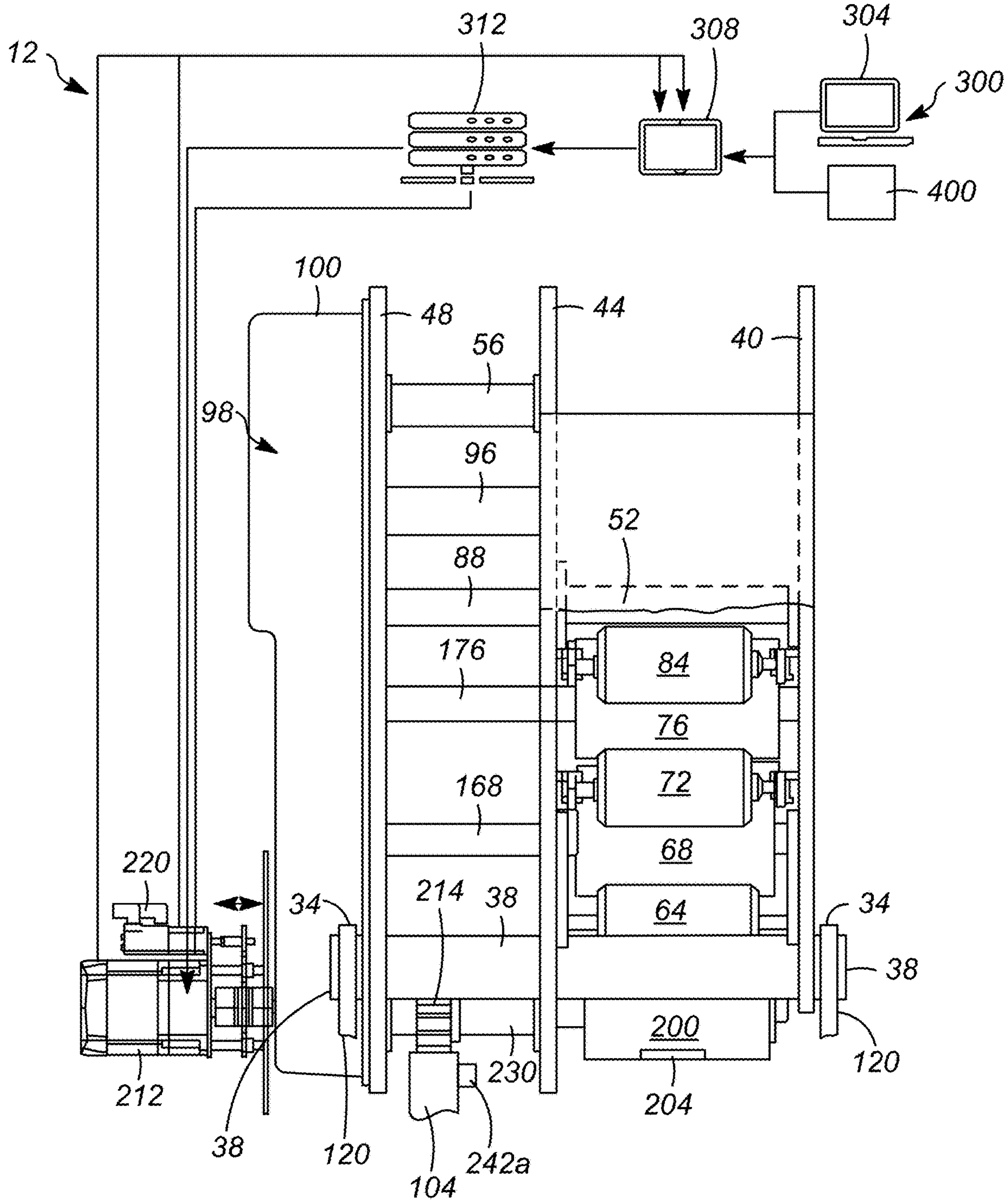
FIG. 10 is a view of an embodiment of an inker of the present disclosure from the B-B perspective illustrated in FIG. 2.
Figure 11:
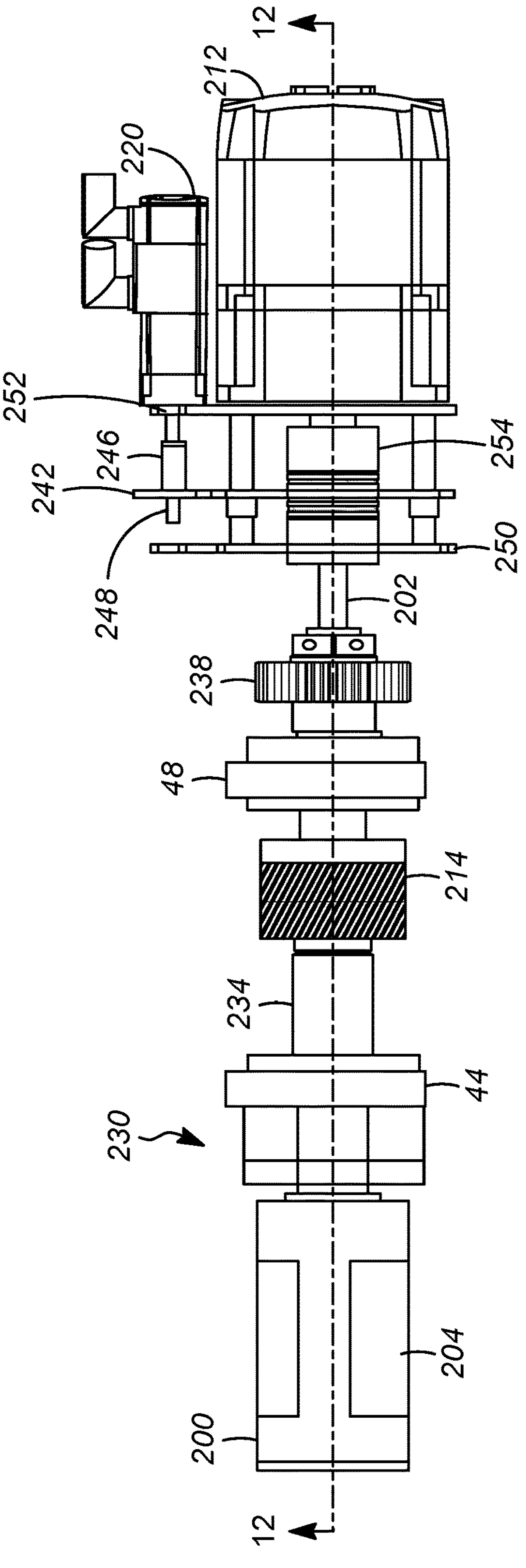
FIG. 11 is side view of a printing plate cylinder shaft of the present invention operably joined to first and second servomotors.
Figure 12:
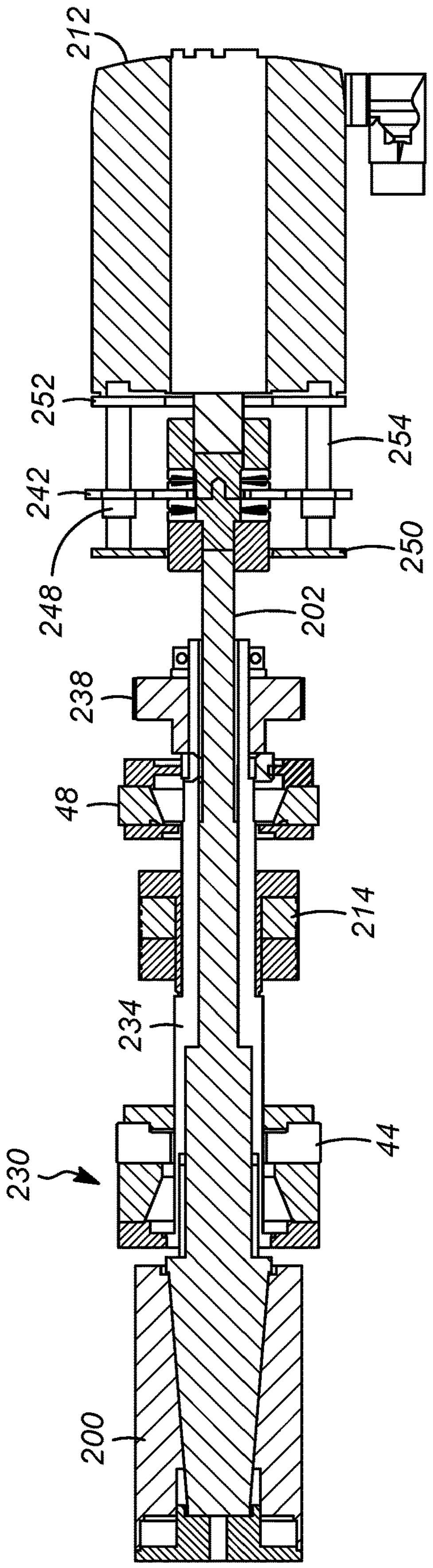
FIG. 12 is a cross-sectional view taken along 12-12 of FIG. 11.
Figure 13:
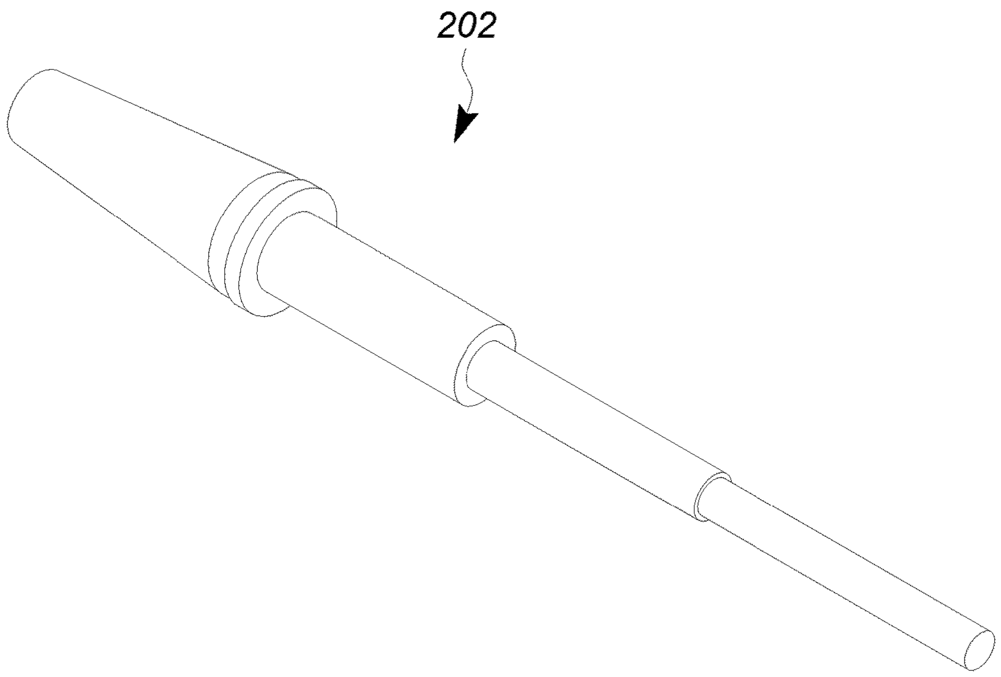
FIG. 13 is an isometric view of an inner shaft of a printing plate cylinder shaft.
Figure 14:
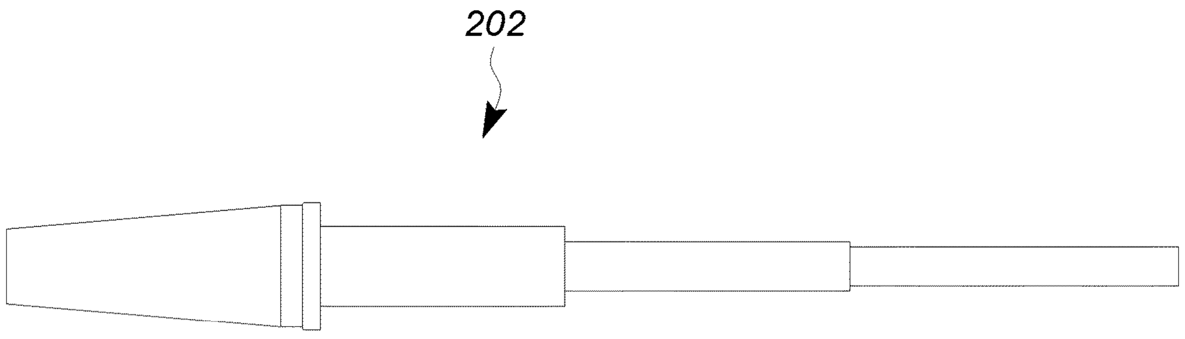
FIG. 14 is a side view of an inner shaft of a printing plate cylinder shaft.
Figure 15:
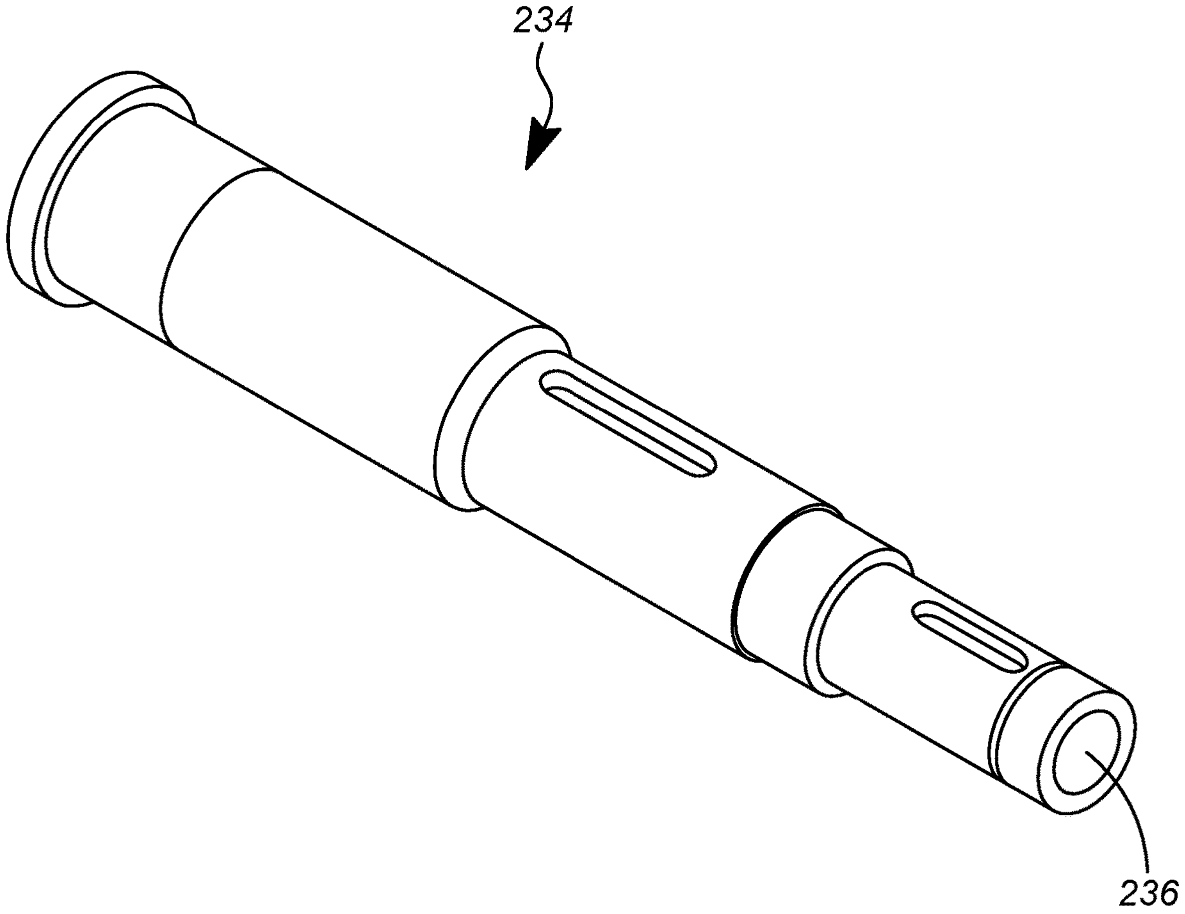
FIG. 15 is an isometric view of an outer shaft of a printing plate cylinder shaft.
Figure 16:
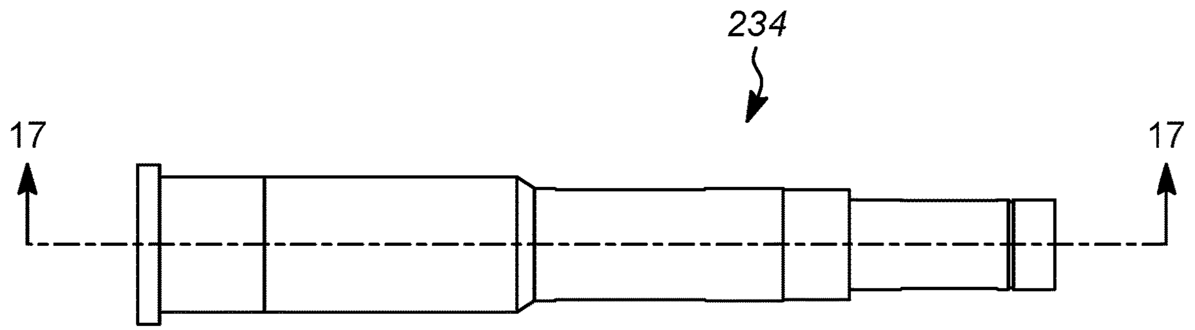
FIG. 16 is a side view of an inner shaft of a printing plate cylinder shaft.
Figure 17:
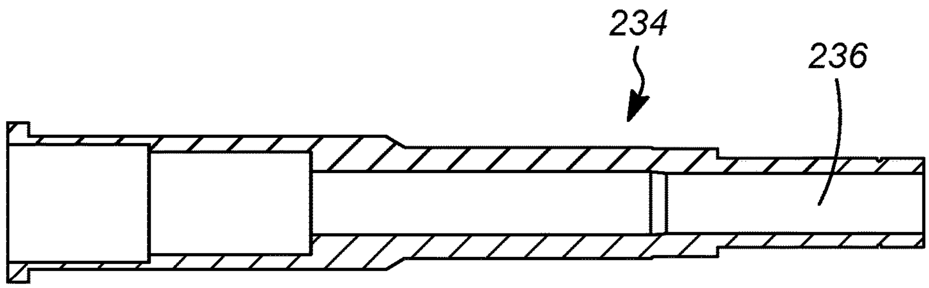
FIG. 17 is a cross-sectional view taken along 17-17 of FIG. 16.

The printing plate cylinder 200 has a printing plate 204 (see FIGS. 6 and 7) disposed thereon. One or both of the printing plate cylinder 200 and the printing plate 204 may be magnetic wherein that the printing plate 204 is attracted to be retained to the printing plate cylinder 200.

Each printing plate 204 has raised features which correspond to the print pattern for the ink color which is applied by the particular inker 12*a*-12*h* to or with which the printing plate cylinder 200 is associated.

Figure 2:
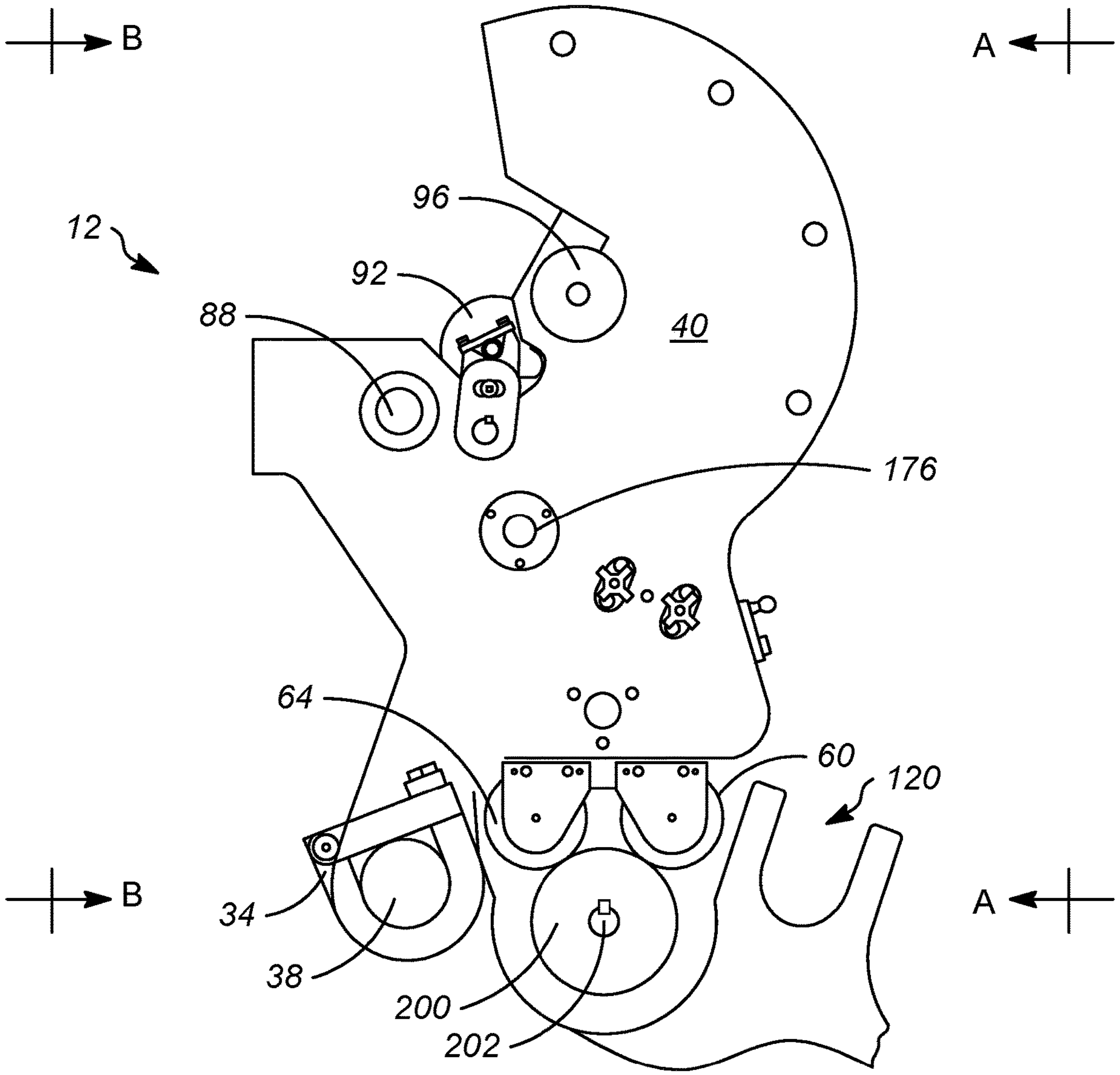
FIG. 2 (Prior Art)
FIG. 2 is a side view of a prior art inker.
Figure 2A:
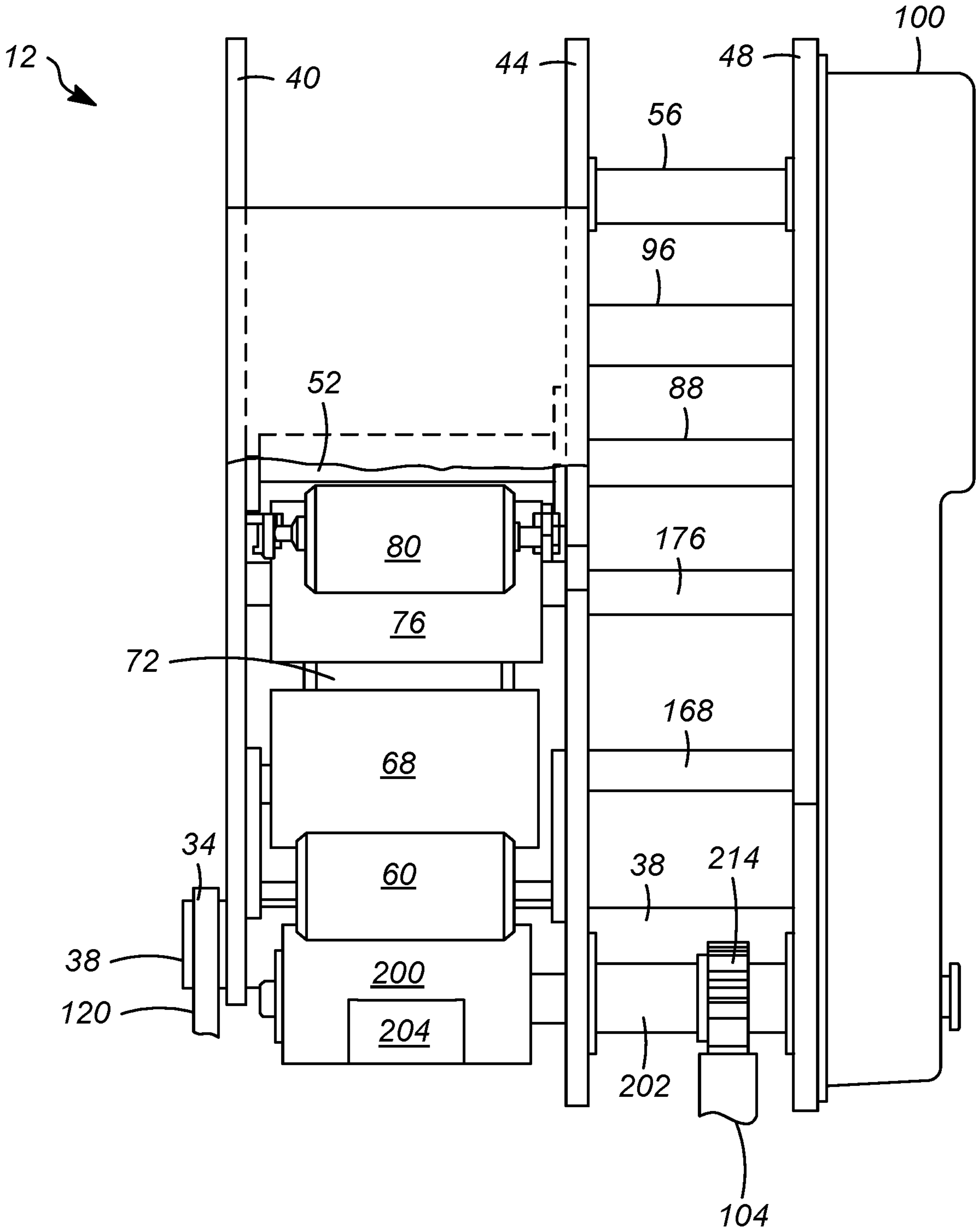
FIG. 2A (Prior Art)
FIG. 2A is a view of the inker of FIG. 2 taken from the perspective of A-A.

Generally, according to FIGS. 2 and 2A, each inker unit 12 is removably secured to a main frame of the decorator 10 by a strap 34 (see, e.g., FIG. 2) in clamping engagement with an outboard extension of a main shaft 38 at a bottom (i.e., in use, a portion of the inker 12 adjacent the blanket wheel 16 which carries rotationally carries the transfer blankets 14) of each inker unit 12. The main shaft 38 is transverse to vertical opposing frame plates 40, 44, 48 that are maintained in operable spaced relationship by additional transverse upper stiffening shafts 52, 56. Stiffening shaft 52 extends between frame plates 40, 44, and Stiffening shaft 56 extends between frame plates 44, 48.

A pair of rubber form rolls 60, 64 is rotatably mounted in the space between frame plates 40, 44 and engaged with plate cylinder 200 and an axially vibrated steel roll 68. A steel roll 68 is engaged by a rubber-covered distribution roll 72, which is engaged with an axially vibrated steel distributing roll 76 that is also engaged by two additional rubber-coated distribution rolls 80, 84. Distribution roll 80 also engages a steel roll (obscured) carried by shaft 88 (see, e.g., FIG. 2) that is engaged with a rubber ductor roll 92. The ductor roll 92 is also engaged with a steel fountain roll (obscured) carried by shaft 96 that combine with other known elements to form boundaries for an ink pool. These rolls will be hereinafter referred to collectively as the inker rolls. For purposes of this disclosure, the distribution rolls of each inker 12 act as a supply of colored fluid, such as ink, for each printing plate 204 in the inker 12 wherein a portion of the printing plate 204 in high relief receives the colored fluid from a supply of colored fluid, in this case the distribution rolls.

Figure 4:
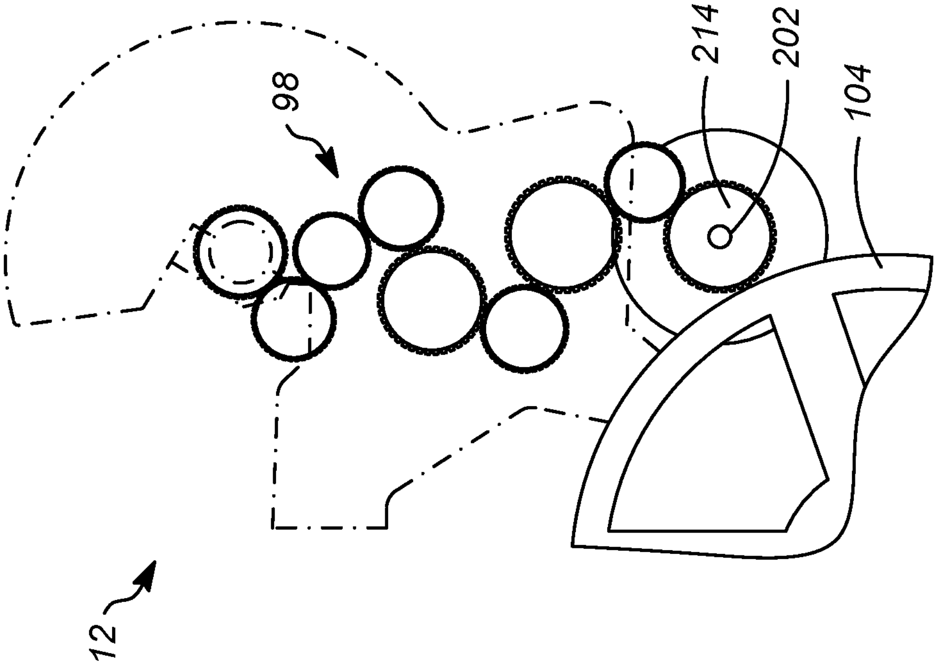
FIG. 4 (Prior Art)
FIG. 4 is a side view of a drive train of a prior art inker.

In a prior art inker, these inker rolls are positively driven through gears of a drive train 98 engaged with gears housed in a gear box 100 (see, e.g., FIG. 4) that are keyed to the printing plate cylinder shaft 202 for the printing plate cylinder 200. A drive gear 214, keyed to the printing plate cylinder shaft 202, is in operable engagement with a bull gear 104 of the blanket wheel 16, which drives rotation of the inker rolls. Printing plate cylinder shaft 202, as well as shafts 168, 176, 88, and 96 for the respective rolls 68, 76, the obscured steel roll, and the fountain roll, extends through the frame plates 42 and 43, and drive gear 214 is disposed between frame plates 44 and 48.

Figure 5:
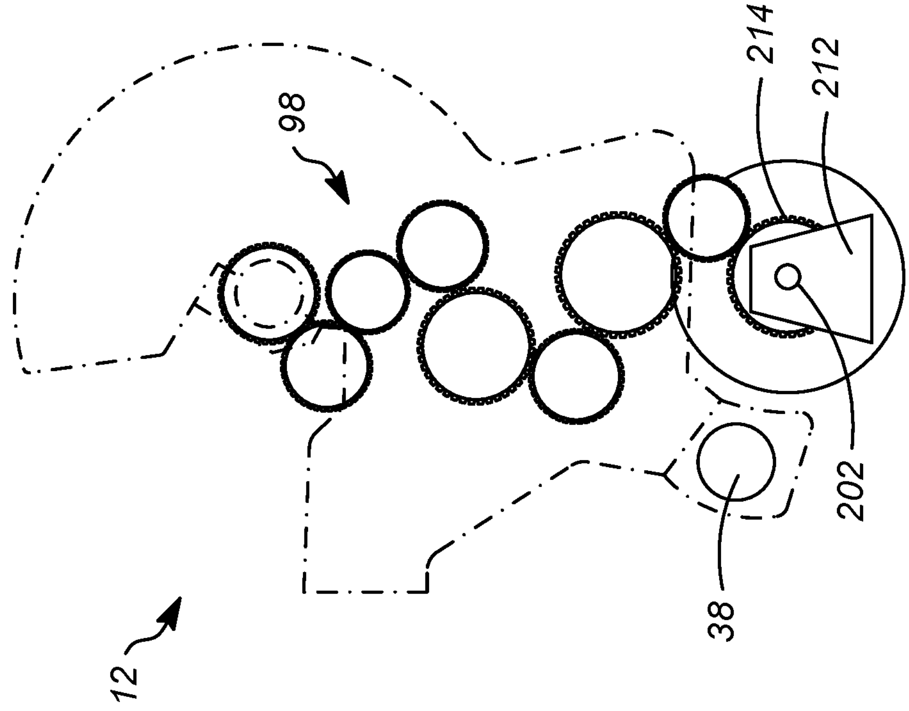
FIG. 5 is a side view of a drive train of an inker of the present disclosure.

However, according to one aspect of the present disclosure, the inkers 12 are outfitted, or an existing inker is retrofitted, with one or more servomotors, which drives the drive train within the gear box 100 (see, e.g., FIG. 5)

Figure 3A:
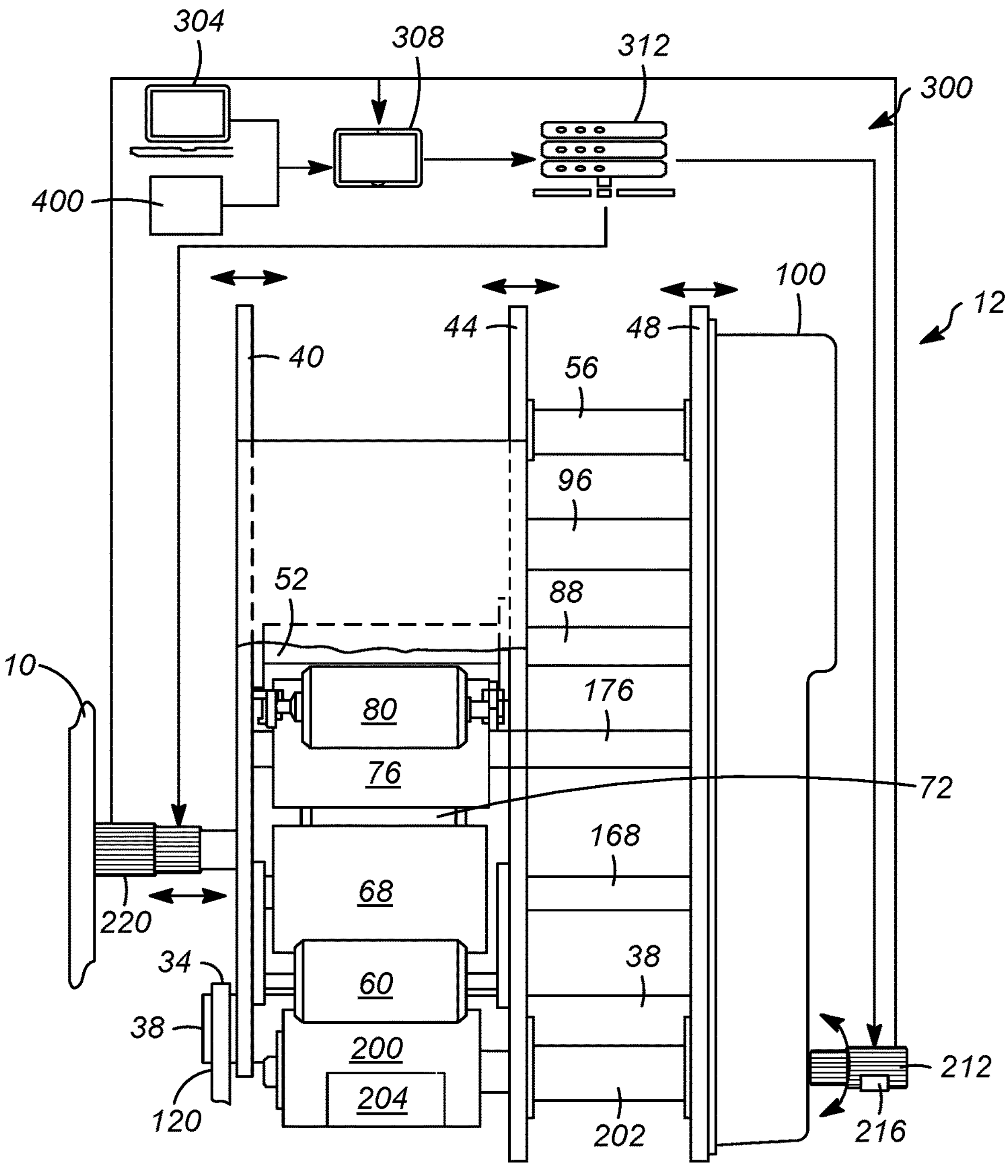
FIG. 3A is a view of an inker of the present disclosure from the A-A perspective illustrated in FIG. 2.
Figure 3B:
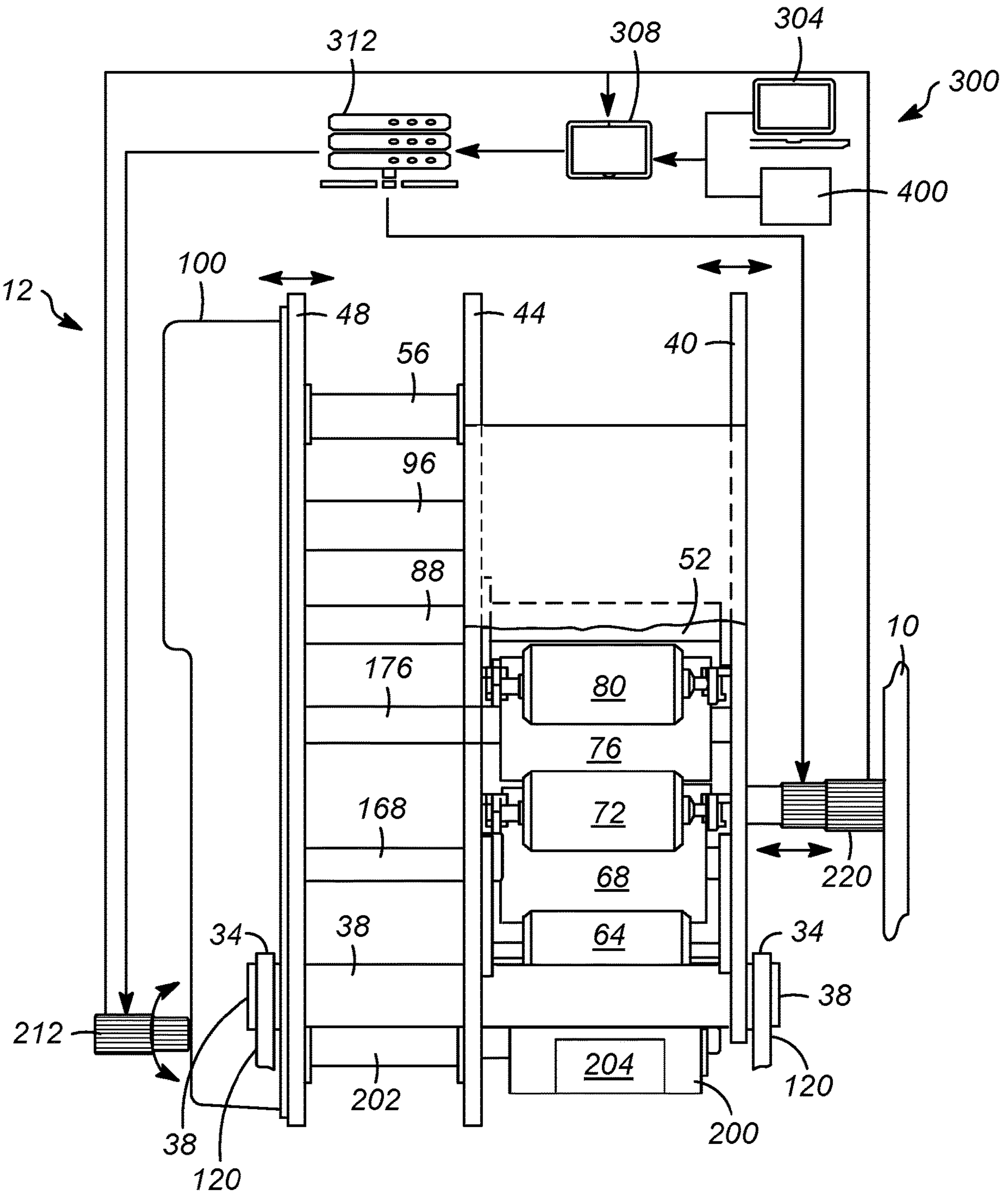
FIG. 3B is a view of an inker of the present disclosure from the B-B perspective illustrated in FIG. 2.

According to an embodiment of the disclosure, as illustrated in, for example, FIGS. 3A and 3B, drive gear 214 is disengaged from the bull gear 104. As illustrated in FIGS. 3A and 3B, the drive gear 214 is removed altogether. Thus, the printing plate cylinder shaft 202 is freewheeling relative to the bull gear 104. An end of the printing plate cylinder shaft 202 distal from the printing plate cylinder 200 extends from the gear box 100 and is connected to a servomotor 212. The servomotor 212 is a rotational or angular adjustment servomotor, and in this way, drives rotation of the printing plate cylinder shaft 202 which, in turn, drives rotation of the shafts 168, 176, 88, and 96 via standard gearing within the gear box 100.

It will be appreciated that the servomotor 212 is able to adjust an angular position of the printing plate cylinder 200. That is the register associated with the circumference of the container.

Again, the servomotor 212 drives rotation of the printing plate cylinder shaft 202 and, by using the existing gears within the gear box 100, to simultaneously drive all the inker rolls within the inkers 12. Thus, a retrofit of the inkers 12 with the servomotor 212 drives rotation of the prior art inker rolls along with the printing plate cylinder shaft 202.

The servomotor 212 with an accompanying encoder 216 drives the gears in the gear box 100. The encoder 216 ensures the servomotor 212 maintains the same speed as the rest of the components of decorator 10 by timing the printing plate cylinder shaft 202 rotational speed with the decorator electronics.

The encoder 216 on the servomotor 212 also allows the servomotor 212 to change the position of the printing plate 204 relative to the blanket cylinder, slightly while rotating, by redefining the encoder position a few thousandths of an inch at a time. This ability would allow the inker rolls, including the printing plate cylinder shaft 202 carrying the printing plate cylinder 200 and the printing plate 204 to be repositioned rotationally. Since the printing plate cylinder shaft 202 is part of the inker gear train, repositioning the inker roll gear train would ultimately reposition the printing plate cylinder 200 and the printing plate 204 carried on the printing plate cylinder 200. Thus, a register of an image transferred to the transfer blanket 14 can be controlled with adjustments by the servomotor 212. This changes circumferential register or left and right register on an upright container An HMI is incorporated in order to make changes to the servomotor 212 which will change register.

According to an aspect of the present disclosure, each inker 12 is outfitted with one or more servomotors 220. The servomotor 220 is provided to modify or change registry of the printing plate 204 in a longitudinal direction (i.e. a lateral adjustment servomotor). The longitudinal direction corresponds to a direction within manufacturing tolerances parallel to an axis of rotation of the printing plate cylinder shaft 202. Thus, this configuration addresses top to bottom register of an image on an upright container.

To achieve automatic longitudinal register, the main shaft 38 on the inkers 12 is machined to allow the inker frame plates 40, 44, 48 to traverse on the main shaft 38 and along a direction of a center axis of the main shaft 38. Bushings can be provided to facilitate the movement of the inker frame plates 44, 44, 48 on the main shaft 38. This configuration allows the inkers 12 to slide side-to-side while maintaining radial inker rigidity.

The decorator 10 includes saddles 120, for example, generally u-shaped support surfaces upon which the main shaft 38 is supported (see FIGS. 2, 3A, and 3B). The main shaft 38 fits/sits through/on the saddles 120. The main shaft 38 and/or the saddles 120 are altered to allow the main shaft 38 to move even when clamped by the strap 34. The straps 34 ensure that the inkers 12 will not move up or down but allow the inker 12 to move parallel to an axis of rotation of the printing plate cylinder shaft 202. This axial motion permits lateral registration.

The servomotors 220 are positioned to act on the inkers 12. These can be linear-type servomotors that push and/or pull the inkers 12 such that a printing plate position relative to the transfer blankets 14 can be altered. As illustrated in, for example, FIGS. 3A and 3B, the servomotors 220 act on the outermost inker frame plates 40, 48. This arrangement can be modified to achieve the best result of the desired side-to-side movement parallel to the axis of rotation of the printing plate cylinder shaft 202. The servomotors 220 can be supported against or by the decorator 10 external to the inkers 12 to provide the necessary opposite force which allows movement of the inkers 12 on their respective main shafts 38. The same result might be obtained using rotating servomotors and a screw mechanism.

The present disclosure also includes a decorator 10 in combination with a controller 300. The controller 300 combine with the modified inkers 12, servomotors 212, 220, and the decorator 10 to form a decorating system that is includes a capability of manually and/or automatically adjusting image alignment of decorated containers "on the fly" or during a production run without appreciably adversely affecting production rate or speed, at the very least, without having to cease the decorating operation to make changes to the register/alignment of the image on the containers. The controller 300 includes a memory and software stored on the memory to regulate the inkers, for example the servomotors 212, 220 on the inkers 12.

Any of the known decorating inspection modules 400 can be used in the controller. Some of these inspection modules 400 are described in a non-limiting way, for example, in PCT/GB2015/053725. This is not intended to be an exhaustive list of the possible inspection modules that can be incorporated into this system and are set forth in this disclosure for illustrative example purposes.

Referring back to FIGS. 3A, 3B, and 6, the controller comprises an HMI 304 in communication with a standard programmable motion controller 308, and amplifier 312, the servomotors 212, 220, the decorator 10 and inkers 12, and the inspection module 400. One or more feedback circuits sends information from the servomotors 212, 220 and the inspection module 400 to the programmable motion controller 308 and/or the HMI 304. The HMI 304 acts as a system control, which in one possible mode of operation enables a user to make corrections manually. However, in another mode of operation, the controller 300 provides an automatic correction of any misregistration of the inks applied by one of more of the inkers 12 by receiving data from the inspection module 400.

The controller 300, again, includes a memory and utilizes a suitable computer program stored in the memory to react to the results obtained by the inspection module 400. The inspection module 400 utilizes a suitable technique for recognizing misregistrations, such as, but not limited to, an optical device, for example, an imager or camera.

The controller 300 and its computer program is also adapted to provide suitable control signals to one or both of the servomotors 212, 220 of an inker 12 in order to correct the detected misregistration. For example, if a misregistration was detected, and it was identified that the cause was that the image applied to the transfer blanket 14 by a particular inker in the plurality of inkers 12 was too high, then the longitudinal position of the printing plate cylinder 200 used in the inker would be modified to correct this misregistration. This would be done by controlling the servomotor 220 associated with main shaft 38 of the inker 12 so as displace the inker 12 along the main shaft 38.

Another type of misregistration occurs when one of the ink colors is applied too far to the left or right on a container, i.e. misaligned about the circumference of the container. In this instance, the controller 300 or operator identifies which inker 12 is responsible for the misregistration and controls the servomotor 212 associated with this inker 12 to adjust the angular or rotational position of the printing plate 204. In this way, the angular orientation of the printing plate cylinder 200 is adjusted so as to correct the misregistration.

It should be understood that if the controller or operator detects that a number of inks are being applied out of register, then appropriate correction of a plurality of inkers will occur. Likewise, misregistration can occur simultaneously laterally and circumferentially. In which case, the servomotors 212, 220 would be activated to adjust the printing plate 204 laterally and circumferentially.

Another aspect of the disclosure is illustrated in FIGS. 9-20, in these embodiments, rotation of the printing plate cylinder 200 is driven by an angular adjustment servomotor 212. The remaining gears of the drive train 98 remain indirectly driven by a bull gear 104, as in the prior art. Thus, the printing plate cylinder 200 rotates independently of the remaining rolls of the inker 12. This is accomplished by providing a two-part shaft 230 which comprises the printing plate cylinder shaft 202 located within a drive train shaft 234. Accordingly, the two-part shaft 230 comprises two shaft components, an inner printing plate cylinder shaft 202 and an outer drive train shaft 234.

In this embodiment, the servomotors 212, 220 are fixedly attached to the decorator frame and are generally not removable with the inkers 12. That is to say, the inkers 12 are removable to swap out designs and are disconnected from and operably joined to the servomotors 212, 220 during such exchanges, retrofits, modifications or upgrades. This differs from the embodiments illustrated in FIGS. 1-7 where the servomotors are generally components of the inkers 12 themselves. In these embodiments, it is more accurate to say that the servomotors 212, 220 are separate from the inkers 12 and, therefore, remain attached to the decorator 10 when one or more inkers 12 are removed.

This embodiment also includes a controller 300. The controller 300 combined with the modified inkers 12, servomotors 212, 220, and the decorator 10 form a decorating system that includes a capability of manually and/or automatically adjusting image alignment of decorated containers "on the fly" or during a production run without appreciably adversely affecting production rate or speed, at the very least, without having to cease the decorating operation to make changes to the register/alignment of the image on the containers. The controller 300 includes a memory and software stored on the memory to regulate the inkers and/or the servomotors 212, 220. This system is operable as described above.

The drive train shaft 234 is mounted on or supported by the inker frame plates 44, 48 of the inker 12. The drive train shaft 234 carries a drive gear 214, such as an anti-backlash helical gear, which is driven by a bull gear 104 of the blanket wheel 16. The drive train shaft 234 extends out of and beyond inker frame plate 48 and into the gear box 100. A portion of the drive train shaft 234 within the gear box 100 carries a spur gear 238 used to rotate the drive train 98 within the gear box 100. The drive train shaft 234 is bored to create a channel or passage 236 within which and through which the printing plate cylinder shaft 202 is fit and passes.

The printing plate cylinder shaft 202 extends out of opposite ends of the drive train shaft 234. The printing plate cylinder 200 is affixed to a first end of the printing plate cylinder shaft 202. An opposite second end of the printing plate cylinder shaft 202 extends beyond the spur gear 238 on the drive train shaft 234 and through and out of the gear box 100 and is operably joined to the angular adjustment servomotor 212. The printing plate cylinder shaft 202 is movable within the drive train shaft 234, both rotationally and axially.

The angular adjustment servomotor 212 is mounted on a bracket attached to the decorator 10.

The lateral adjustment servomotor 220 is mounted with the angular adjustment servomotor 212 on the bracket to the decorator 10. The lateral adjustment servomotor 220 does not contribute to the rotational drive of the printing plate cylinder shaft 202. Instead, the lateral adjustment servomotor 220 is a linear servomotor. Alternatively, the lateral adjustment servomotor 220 is coupled to a linear drive plate 242 through a ball nut 246 and a ball screw 248. The linear drive plate 242 engages a coupler 254 which operably joins the printing plate cylinder shaft 200 to the angular adjustment servomotor 212.

This embodiment functions in the following manner. As the decorator blanket wheel 16 rotates in normal operation, the bull gear 104 attached to the blanket wheel 16 will rotate therewith. The rotation of the bull gear 104, in turn, rotates the drive train shaft 234 by engagement with the drive gear 214. The rotation of the drive train shaft 234 causes the spur gear 238 to rotate therewith. The spur gear 214 drives the drive train 98 causing the inker rolls other than the printing plate cylinder 200 to rotate. Thus, rotation of the drive train shaft 234 drives all of the rolls in the inker 12 by way of the spur gear 238, but not the printing plate cylinder 200.

Simultaneously, a sensor **242*a*, such as an encoder, senses the motion of the bull gear 104. The sensor 242*a* generates a signal corresponding to the rotational speed by the bull gear 104. A controller receives the signal, instructs the angular adjustment servomotor 212 to rotate its shaft in unison with the bull gear 104, normally at exactly the same speed as the bull gear 104, with an exception being when an angular correction is in the process of being made. The printing plate cylinder shaft 202 is attached to the rotational shaft of the angular adjustment servomotor 212 such that the angular adjustment servomotor 212 imparts the desired rotational speed to the printing plate cylinder 200 via the printing plate cylinder shaft 202. This allows the printing plate cylinder shaft 200 to stay in time (synchronized) with the drive train shaft 234 which permits accurate ink transfer from the printing plate 204 attached to the printing plate cylinder 200 to a transfer blanket carried on the blanket wheel 16**.

The angular adjustment servomotor 212 driven by the printing plate cylinder shaft 200 ensures a perfectly matched speed with the entire decorator 10. The angular adjustment servomotor 212 can incrementally rotate the printing plate cylinder shaft 200 to which the angular adjustment servomotor 212 is operably joined to adjust a rotational position of the printing plate 204 attached to the printing plate cylinder shaft 200 in relation to the transfer blanket 14. In a case where a printed image resulting from a printing plate 204 on a printing plate cylinder 202 does not circumferentially match the images from other inkers on the transfer blanket, the angular adjustment servomotor 212 can make incremental rotational corrections by incrementally rotating the printing plate cylinder shaft 202 independent of any rotation by the drive train shaft 234. One or more increments provided by the angular adjustment servomotor 212 to the printing plate cylinder shaft 200 can be determined based on an inspection of one or more of a decorated container and the transfer blanket. Thus, the angular adjustment servomotor 212 is configured to selectively alter a position of a graphic on a decorated cylindrical container in a direction about a circumference of the container from right to left or from left to right, as the container is standing on end.

Figure 18:
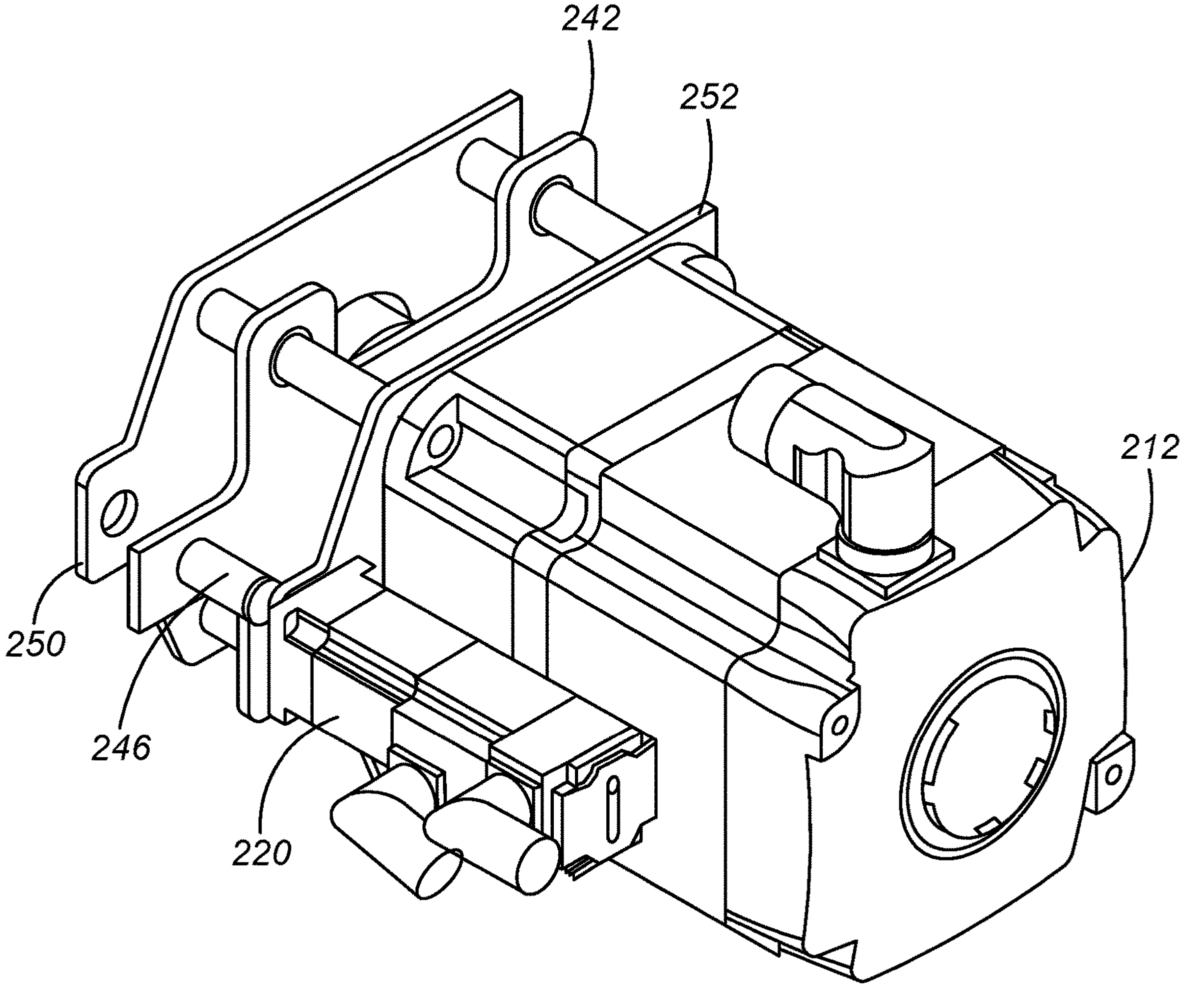
FIG. 18 is an isometric view of a common assembly of first and second servomotors.
Figure 19:
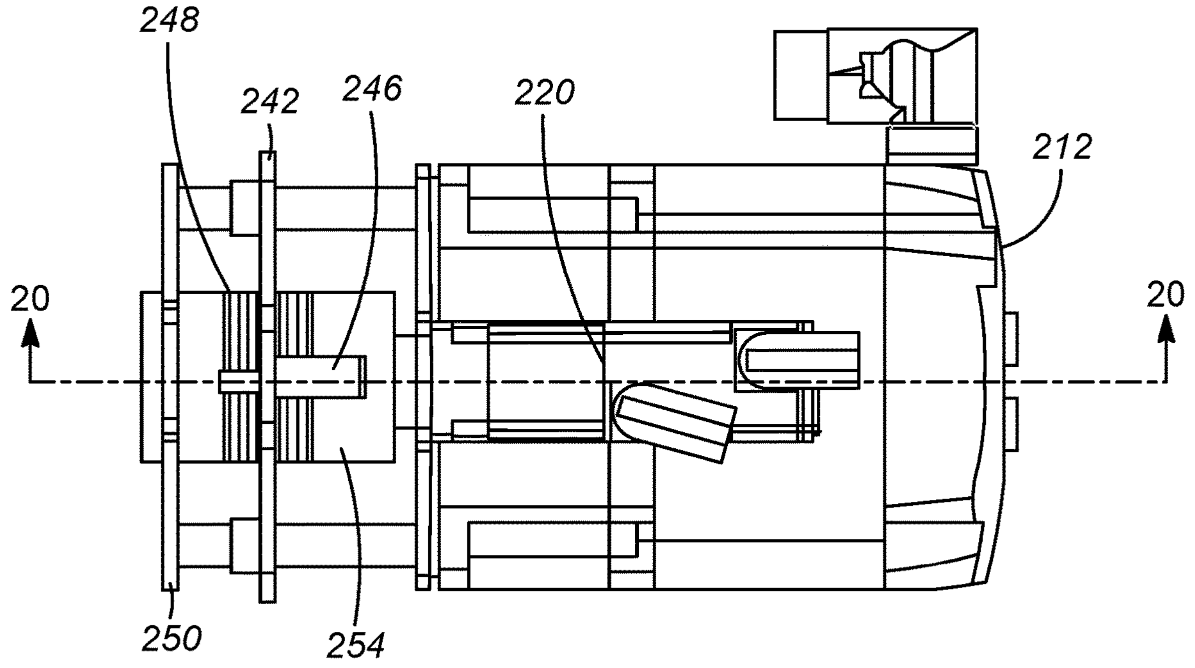
FIG. 19 is a side view of a common assembly of first and second servomotors.
Figure 20:
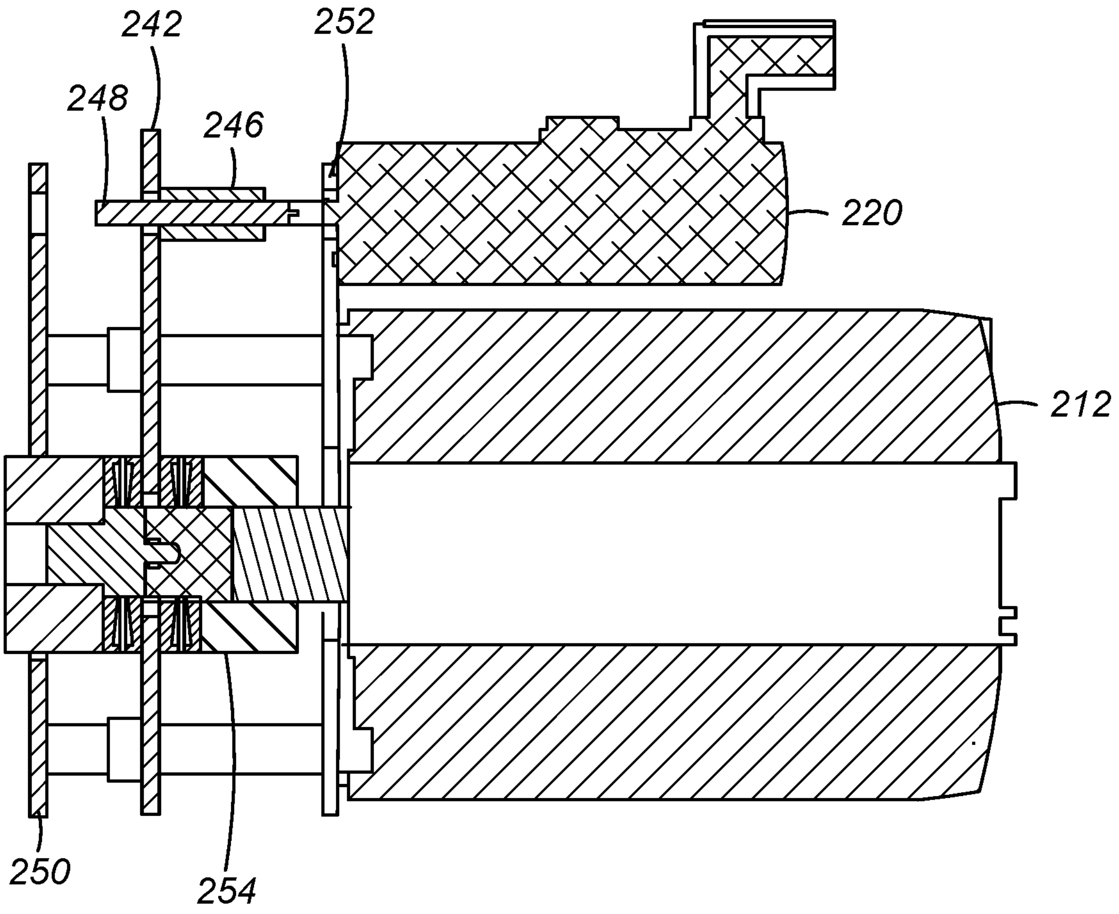
FIG. 20 is a cross-sectional view taken along 20-20 of FIG. 19.
Figure 21:
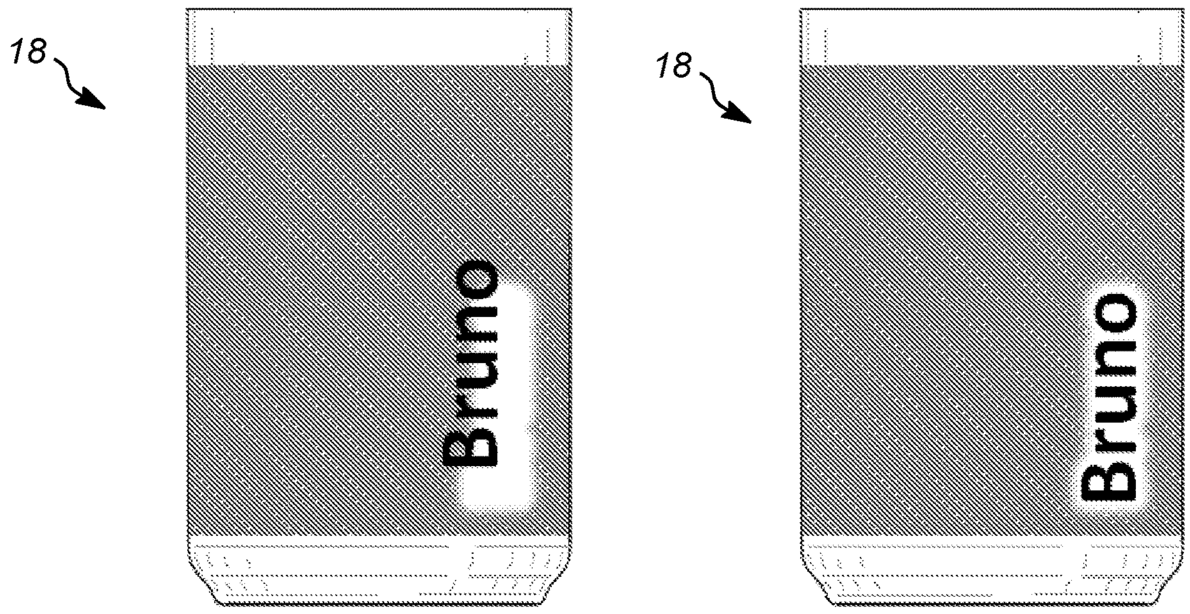
FIG. 21 comprises a side view of a container with a laterally and angularly misregistered design on the left and a side view of a container with a properly registered design on the right.
Figure 22:
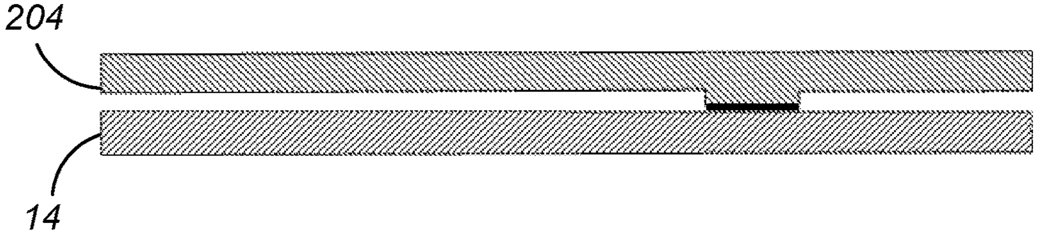
FIG. 22 is a view of a high relief portion of a printing plate engaging a transfer blanket.

The lateral adjustment servomotor 220 may be a linear servomotor. In the case where a printed image delivered by a printing plate 204 attached to a given printing plate cylinder 202 is out of registration, does not line up, or does not laterally match the images from the other inkers 12 on a given transfer blanket, the lateral adjustment servomotor 220 is activated to shift the printing plate cylinder shaft 200 inwardly or outwardly in a direction parallel to a rotational axis of the printing plate cylinder shaft 200 until the image matches. The lateral adjustment servomotor 220 is operably joined to the printing plate cylinder shaft 200 of an associated inker 12 and imparts a lateral adjustment to the printing plate cylinder shaft 200 in a direction parallel to a center axis of the two-piece shaft 230 of the associated inker 12 to adjust a position of the printing plate 204 of the associated inker 12 in relation to the transfer blanket 14. A magnitude of the linear motion may be determined by an inspection of at least one of the beverage container and the transfer blanket As illustrated in FIGS. 18-20, the servomotors 212,220 can be supplied on a common assembly. This common assembly is attached to the decorator frame wherein the common assembly remains attached to decorator frame during swap outs of designs and changes of the inkers 12. The common assembly includes the servomotors 212,220 mounted to a motor mount plate 250 by fasteners. The motor mount plate 250 is attached to a fixed plate 252, which may be a portion of the decorator frame. The linear drive plate 242 is joined to a shaft of the angular adjustment servomotor 212 by the coupler 254. The lateral adjustment servomotor 220 acts on the linear drive plate 242 to adjust the lateral position of the printing plate cylinder shaft 202.

In one embodiment, the angular adjustment servomotor 212 is capable of incrementally correcting angular errors by rotating the printing plater cylinder shaft 200 less than 0.001 inches (0.0254 mm), and more preferably 0.0005 inches (0.0127 mm). The printing plate cylinder is generally about 15.5 inches in circumference.

In one embodiment, the lateral adjustment servomotor 220 is capable of incrementally adjusting a position of the printing plate cylinder 204 laterally in a direction parallel to the axis of rotation of the printing plate cylinder shaft 200. A range of lateral correction is 0.0 inches to 0.600 inches (0.0 mm to 15.24 mm), more preferably 0.0 inches to 0.350 inches (0.0 to 8.89 mm) and most preferably 0.0 inches to 0.300 inches (0.0 mm to 7.63 mm).

Advantages of the embodiment illustrated in FIGS. 9-20 include faster label design change-over times. Additionally, because fine registration/alignment adjustments can be made during a production run while containers are being decorated, more detailed and precise designs can be printed, especially in terms of shading and proximity of one design color to a second design color. Additionally, different colors in a graphic design can be placed closer to each other, as manufacturing tolerances can be tightened and improved. The methods, apparatuses, systems disclosed herein are capable of making either or both lateral and angular adjustments between 0.300 inches (7.63 mm) and 0.0005 inches (0.0127 mm).

While the specific embodiments have been illustrated and described, numerous modifications come to mind without significantly departing from the spirit of the invention, and the scope of protection is only limited by the scope of the accompanying Claims.

What is claimed is:

1. A decorator for printing onto cylindrical structures comprising:
- a plurality of inkers, each inker comprising:
  - a pair of opposing frame plates;
  - a printing plate affixed to a printing plate cylinder carried by a rotational printing plate cylinder shaft disposed between the opposing frame plates;
  - a main shaft supporting the inker on the decorator wherein the pair of opposing frame plates are slidable along a length of the main shaft;
- a plurality of lateral adjustment servomotors, each lateral adjustment servomotor acting on a corresponding inker to impart a movement by the inker on the length of the main shaft in a direction parallel to the length of the main shaft.

2. The decorator of claim 1 wherein each printing plate comprises a portion in high relief, wherein the high relief portion receives a colored fluid from a supply of colored fluid.

3. The decorator of claim 2 further comprising:
- a blanket wheel rotationally mounted on the decorator; and
- a plurality of transfer blankets attached to the blanket wheel and rotational therewith,
- wherein each transfer blanket engages each of the printing plates to receive quantity of the colored fluid therefrom, wherein a location of the colored fluid across a surface of each transfer blanket is regulated by a servomotor in the plurality of lateral adjustment servomotors.

4. The decorator of claim 3 wherein each inker further comprises:
- a plurality of rolls disposed between the opposing frame plates, each roll carried by a corresponding rotational shaft;
- a drive train comprising a plurality of gears, each gear attached to a rotational shaft,
- wherein the drive train is movable along the length of the main shaft in response to a force provided by the servomotor in the plurality of lateral adjustment servomotors.

5. The decorator of claim 4 wherein each inker further comprises:
- an angular adjustment servomotor in operable communication with the printing plate cylinder shaft to impart rotation thereto, wherein the angular adjustment servomotor is configured to adjust a registration of the printing plate in relation to the plurality of transfer blankets.

6. The decorator of claim 5 wherein each lateral adjustment servomotor is configured to selectively alter a position of a graphic on a decorated cylindrical container in a direction parallel a center axis about which the container is centered from a top to a bottom of the container.

7. The decorator of claim 6 wherein each angular adjustment servomotor is configured to selectively alter a position of a graphic on a decorated cylindrical container in a direction about a circumference of the container is centered from right to left or from left to right.

8. The decorator or claim 7 wherein each inker further comprises:
- an encoder for outputting rotational speed and angular position data of the angular adjustment servomotor.

9. The decorator according to claim 8 further comprising:
- a container component conveyor for transporting the container components into and out of contact with the transfer blankets.

10. The decorator of claim 9 wherein the container component conveyor comprises a mandrel carrier for holding can bodies thereon.

11. The decorator of claim 1 wherein each inker comprises a pair of lateral adjustment servomotors, wherein one of the pair of lateral adjustment servomotors acts on one of the opposing frame plates and the other of the lateral adjustment servomotors acts the other of the opposing frame plates to displace the printint plate cylinder back and forth in a direction parallel with an axis of rotation of the main shaft.

12. A decorator for printing onto cylindrical structures comprising:
- a rotating blanket wheel carrying a transfer blanket;
- a bull gear rotating with the blanket wheel;
- a plurality of inkers, each inker comprising:
  - a pair of opposing frame plates;
  - a printing plate affixed to a printing plate cylinder;
  - a plurality of inker rolls positively driven by a corresponding plurality of inker gears forming a drive train;
  - a two-piece shaft comprising a first shaft and a second shaft, the first shaft in operable communication with the drive train and having a central passage passing therethrough and the second shaft rotating within the passage independently of rotation by the first shaft;
  - a first gear operably joined to the first shaft and in engagement with the bull gear;
  - a second gear operably joined to the first shaft and the drive train,
  - wherein rotational motion by the bull gear transfers rotation to the first gear which transfers rotational motion to the second gear, which transfers rotating motion to the plurality of inker gears forming the drive train,
- a plurality of angular adjustment servomotors, each angular adjustment servomotor associated with an inker in the plurality of inkers and operably joined to the second shaft within the first shaft and imparting rotation thereto.

13. The decorator of claim 12 further comprising a sensor measuring a rotational speed of a decorator component.

14. The decorator of claim 13 further comprising a controller, wherein the controller receives a signal from the sensor corresponding to the rotational speed, and wherein the controller signals at least one of the plurality of angular adjustment servomotors to impart rotational rotating motion at a speed equal to a speed of rotation of the first shaft to the second shaft to which the at least one of the plurality of angular adjustment servomotors is operably joined.

15. The decorator of claim 14 wherein the at least one of the plurality of angular adjustment servomotors incrementally rotates the second shaft to which the at least one of the plurality of angular adjustment servomotors is operably joined to adjust a rotational position of a printing plate attached to the second shaft in relation to the transfer blanket.

16. The decorator of claim 15 wherein one or more increments provided by the at least one of plurality of angular adjustment servomotors to the second shaft to which the at least one of the plurality of adjustment servomotors is operably joined is determined based on an inspection of one of a decorated container and the transfer blanket.

17. The decorator of claim 16 further comprising a plurality of lateral adjustment servomotors, each of the plurality lateral adjustment servomotors associated with an inker of the plurality inkers, wherein each of the plurality of lateral adjustment servomotors is operably joined to the second shaft of the associated inker and imparts a lateral adjustment to the second shaft in a direction parallel to a center axis of the two-piece shaft of the associated inker to adjust a position of the printing plate of the associated inker in relation to the transfer blanket.

18. The decorator of claim 17 wherein the transfer blanket engages each printing plate to receive quantity of the colored fluid therefrom, wherein a location of the colored fluid across a surface of the transfer blanket is regulated by a servomotor in the plurality of angular adjustment servomotors.

19. The decorator of claim 18 wherein each angular adjustment servomotor is configured to selectively alter a position of a graphic on a decorated cylindrical container in a direction about a circumference of the container from right to left or from left to right.

20. The decorator of claim 19 wherein each inker further comprises an encoder for outputting rotational speed of the bull gear.

* * * * *